United States Patent
Bagnell et al.

(10) Patent No.: US 11,787,439 B1
(45) Date of Patent: Oct. 17, 2023

(54) MULTISTAGE AUTONOMOUS VEHICLE MOTION PLANNING

(71) Applicant: Aurora Operations, Inc., Mountain View, CA (US)

(72) Inventors: James Andrew Bagnell, Pittsburgh, PA (US); Shervin Javdani, San Francisco, CA (US); Venkatraman Narayanan, Mountain View, CA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 0 days.

(21) Appl. No.: 17/989,898

(22) Filed: Nov. 18, 2022

(51) Int. Cl.
*B60W 60/00* (2020.01)
*B60W 40/04* (2006.01)

(52) U.S. Cl.
CPC ............ *B60W 60/00* (2020.02); *B60W 40/04* (2013.01)

(58) Field of Classification Search
None
See application file for complete search history.

(56) References Cited

U.S. PATENT DOCUMENTS

| | | | |
|---|---|---|---|
| 2020/0110414 A1* | 4/2020 | Dupre | B60W 60/0011 |
| 2021/0108936 A1* | 4/2021 | Seegmiller | B60W 60/0015 |
| 2022/0250641 A1* | 8/2022 | Seegmiller | B60W 60/0011 |
| 2023/0041975 A1* | 2/2023 | Caldwell | G05B 13/0265 |

* cited by examiner

*Primary Examiner* — David P. Merlino
(74) *Attorney, Agent, or Firm* — Dority & Manning, P.A.

(57) ABSTRACT

Example methods for multistage autonomous vehicle motion planning include obtaining sensor data descriptive of an environment of the autonomous vehicle; identifying one or more objects in the environment based on the sensor data; generating a plurality of candidate strategies, wherein each candidate strategy of the plurality of candidate strategies comprises a set of discrete decisions respecting the one or more objects, wherein generating the plurality of candidate strategies includes: determining that at least two strategies satisfy an equivalence criterion, such that the plurality of candidate strategies include at least one candidate strategy corresponding to an equivalence class representative of a plurality of different strategies that are based on different discrete decisions; determining candidate trajectories respectively for the plurality of candidate strategies; and initiating control of the autonomous vehicle based on a selected candidate trajectory.

20 Claims, 13 Drawing Sheets

MULTISTAGE AUTONOMOUS VEHICLE MOTION PLANNING

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

The present disclosure is directed to improved autonomous vehicle motion planning including a multistage planning pipeline. A multistage planning pipeline according to the present disclosure can include, for instance, strategy generation and trajectory optimization components. An autonomous vehicle can perceive an environment with an array of sensors. The autonomous vehicle can strategize about how to interact with and traverse the environment by considering its decision-level options for movement (e.g., yield/not yield for merging vehicle, etc.). For instance, the autonomous vehicle can generate a number of strategies comprising sets of decisions for interacting with and moving through the environment. The autonomous vehicle can determine how to optimize execution of the various strategies and can evaluate and compare the optimized trajectories to obtain an optimized plan for controlling the motion of the autonomous vehicle.

In some implementations, a strategy includes a set of discrete decisions for traversing an environment. For example, an autonomous vehicle positioned in an unprotected left turn lane in an intersection can choose whether to yield to an oncoming vehicle or to instead proceed in advance of the vehicle's arrival. The autonomous vehicle can also choose to yield to a pedestrian that is approaching a crosswalk across the intersection or to instead proceed in advance of the pedestrian's arrival. A set of possible strategies could include a set of decisions {yield, yield}, the decision set {not yield, not yield}, the decision set {not yield, yield}, and the decision set {yield, not yield}.

Real-world environments can be complex, involving many possible decisions. Determining an optimal strategy by naïve, brute-force reasoning over all possible permutations of a set of decisions can be computationally prohibitive. For instance, as one simplistic example for illustration, naïve enumeration of possible strategies for an intersection with 5 cars, 5 pedestrians, and 1 traffic light, with a single decision of yield or not yield for each, can lead to $2^5*2^5*2^1=2048$ strategies for consideration. In comparison, if any decision with respect to any of the pedestrians will have an equivalence with respect to the decisions with respect to the other pedestrians (e.g., all the pedestrians are in a tightly spaced group, such that an autonomous vehicle would in effect yield or not yield to the pedestrians all the same), the number of strategies in a reduced search space could be $2^5*2^1*2^1=128$ strategies.

Advantageously, the strategy construction described herein can include focusing the strategy search space by reducing the search space into equivalent strategy classes based on an equivalence criterion. For instance, instead of individually enumerating each of a group of strategies that satisfy an equivalence criterion, the equivalent class can be represented by a representative strategy for processing in the pipeline. For example, some decisions can logically foreclose or supersede other decisions. Furthermore, given a set of constraints or other criteria, some decisions dominate evaluation of a strategy such that various strategies that share that decision will evaluate as equivalents (e.g., a penalty associated with one decision is so dominant that other subsequent decisions do not affect the evaluation). For instance, an equivalence class can be determined such that members share a cost function, so that a representative member can be evaluated for improved efficiency.

For example, in some implementations, trajectory optimization can seek to determine a minimum cost strategy. Strategy construction can group and treat together strategies that share an equivalent minimum cost basin (e.g., based on the strategies sharing a costing function), since the minima of each of those strategies could provide an equivalent minimum cost solution (e.g., the same minimum-cost trajectory by optimizing the same costing function). Strategy construction can thereby focus the search space on strategies with different possible cost minima, so distinct options can be explored without duplicative processing overhead during trajectory optimization.

Of additional advantage, the multistage motion planning pipeline can provide for improved comparison of candidate motion plans by generating trajectories for different candidate strategies. For instance, a motion plan optimization can, in some aspects, be thought of as a global optimization problem for minimizing a cost associated with the executed motion plan. Some prior techniques are forced to determine a single set of decisions that constrain possible trajectories for execution, such that the search space is prematurely narrowed before optimization of any candidate trajectories. However, in contrast, the multistage planning pipeline according to the present disclosure can provide for exploration of multiple different strategies representing multiple different regions of local minima, such that the autonomous vehicle can reason over locally optimized candidate trajectories to more robustly optimize the executed motion plan.

In this manner, for example, an autonomous vehicle can focus an expansive search space of strategies such that searching for an optimal strategy is tractable. This can provide a number of technical effects and benefits. For instance, by grouping equivalents in the search space, a wider variety of strategies can be considered using a given amount of processing time or computational resources. In turn, this can provide for improved identification of optimal motion plans. For example, onboard computing systems for autonomous vehicles can be resource constrained. Improving the capacity of the onboard computing systems to generate robust sets of candidate strategies and motion plans can improve the capabilities of the autonomous vehicle itself to interact with and move through real-world environments. Further advantages can include reduction in computational loads for conducting strategy searches, decreased memory usage, decreased electrical usage (e.g., peak and/or sustained) for improved energy efficiency, and the like.

For example, in an aspect, the present disclosure provides an example autonomous vehicle control system for controlling an autonomous vehicle. The example autonomous vehicle control system includes one or more processors and one or more non-transitory computer-readable media storing instructions executable to cause the one or more processors to perform operations. In the example system, the operations include obtaining sensor data descriptive of an environment of the autonomous vehicle. In the example system, the operations include identifying one or more objects in the environment based on the sensor data. In the example system, the operations include generating a plurality of candidate strategies. In the example system, each candidate strategy of the plurality of candidate strategies includes a set of discrete decisions respecting the one or more objects. In the example system, generating a plurality of candidate strategies includes determining that at least two strategies satisfy an equivalence criterion, such that the plurality of candidate strategies include at least one candidate strategy corresponding to an equivalence class representative of a plurality of different strategies that are based on different discrete decisions. In the example system, the operations include determining candidate trajectories respectively for the plurality of candidate strategies. In the example system, the operations include initiating control of the autonomous vehicle based on a selected candidate trajectory.

In some implementations, generating a plurality of candidate strategies include generating a graph structure including nodes corresponding to strategy states associated with the plurality of candidate strategies and edges corresponding to the discrete decisions made with respect to the nodes.

In some implementations of the example autonomous vehicle control system, the plurality of candidate strategies correspond to one or more leaf nodes respectively terminating one or more paths across the graph structure from a root node.

In some implementations of the example autonomous vehicle control system, the plurality of candidate strategies are a proper subset of a larger set of possible candidate strategies, the plurality of candidate strategies determined by deprioritizing low-likelihood nodes while generating the graph structure.

In some implementations of the example autonomous vehicle control system, the operations include determining, based on comparison of first constraints associated with a parent node and second constraints associated with a new child node, that the first constraints dominate the second constraints, and terminating growth of the graph structure through the new child node.

In some implementations of the example autonomous vehicle control system, the graph structure is a directed acyclic graph in which at least one node of the nodes is intersected by a plurality of incoming edges of the edges.

In some implementations of the example autonomous vehicle control system, the plurality of different strategies are characterized by a shared cost function.

In some implementations of the example autonomous vehicle control system, a cost computed for the at least one candidate strategy is imputed to the plurality of different strategies.

In some implementations of the example autonomous vehicle control system, the plurality of candidate strategies include an evaluation in a first costing stage, and the candidate trajectories are determined in a second costing stage.

In some implementations of the example autonomous vehicle control system, the operations include evaluating a coarse cost to rank the plurality of candidate strategies, and evaluating a refined cost to optimize the candidate trajectories respectively for the plurality of candidate strategies.

In some implementations of the example autonomous vehicle control system, generating the plurality of candidate strategies includes determining a feasibility of satisfying a set of constraints associated with a respective decision.

In some implementations of the example autonomous vehicle control system, the operations include locally optimizing the candidate trajectories respectively for the plurality of candidate strategies and determining the selected candidate trajectory by arbitration among the locally optimized candidate trajectories.

In an aspect, the present disclosure provides for one or more example non-transitory computer-readable media storing instructions executable to cause one or more processors to perform operations. The operations include obtaining sensor data descriptive of an environment of an autonomous vehicle. The operations include identifying one or more objects in the environment based on the sensor data. The operations include generating a plurality of candidate strategies. For the operations, each candidate strategy of the plurality of candidate strategies includes a set of discrete decisions respecting the one or more objects. For the operations, generating the plurality of candidate strategies includes determining that at least two strategies satisfy an equivalence criterion, such that the plurality of candidate strategies include at least one candidate strategy corresponding to an equivalence class representative of a plurality of different strategies that are based on different discrete decisions. The operations include determining candidate trajectories respectively for the plurality of candidate strategies. The operations include initiating control of the autonomous vehicle based on a selected candidate trajectory.

In some implementations of the one or more example non-transitory computer-readable media, generating a plurality of candidate strategies includes generating a graph structure including nodes corresponding to strategy states associated with the plurality of candidate strategies and edges corresponding to the discrete decisions made with respect to the nodes.

In some implementations of the one or more example non-transitory computer-readable media, the plurality of candidate strategies correspond to one or more leaf nodes respectively terminating one or more branches of the graph structure.

In some implementations of the one or more example non-transitory computer-readable media, the graph structure is a directed acyclic graph in which at least one node of the nodes is intersected by a plurality of incoming edges of the edges.

In some implementations of the one or more example non-transitory computer-readable media, the plurality of different strategies are characterized by a shared cost function.

In some implementations of the one or more example non-transitory computer-readable media, a cost computed for the at least one candidate strategy is imputed to the plurality of different strategies.

In an aspect, the present disclosure provides for an example computer-implemented method. The example method includes obtaining sensor data descriptive of an environment of the autonomous vehicle. The example method includes identifying one or more objects in the environment based on the sensor data. The example method includes generating a plurality of candidate strategies. In the example method, each candidate strategy of the plurality of candidate strategies includes a set of discrete decisions respecting the one or more objects. In the example method, generating the plurality of candidate strategies includes determining that at least two strategies satisfy an equivalence criterion, such that the plurality of candidate strategies include at least one candidate strategy corresponding to an equivalence class representative of a plurality of different strategies that are based on different discrete decisions. The example method includes determining candidate trajectories respectively for the plurality of candidate strategies. The example method includes initiating control of the autonomous vehicle based on a selected candidate trajectory.

In some implementations of the example method, the plurality of different strategies are characterized by a shared cost function.

Other example aspects of the present disclosure are directed to other systems, methods, vehicles, apparatuses, tangible non-transitory computer-readable media, and devices for generating trajectories, training models, and performing other functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

Figure 1:
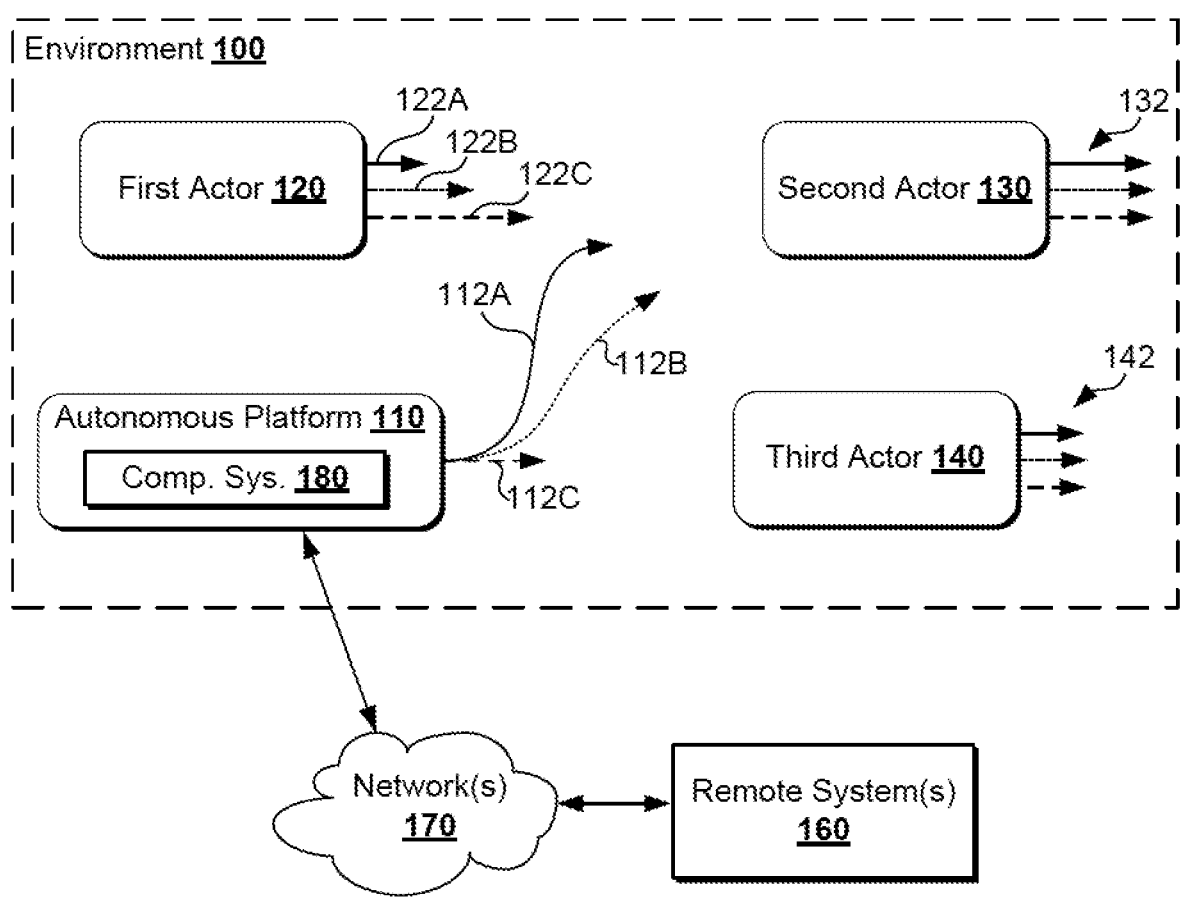
FIG. 1 is a block diagram of an example operational scenario, according to some implementations of the present disclosure.

With reference to FIGS. 1-13, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
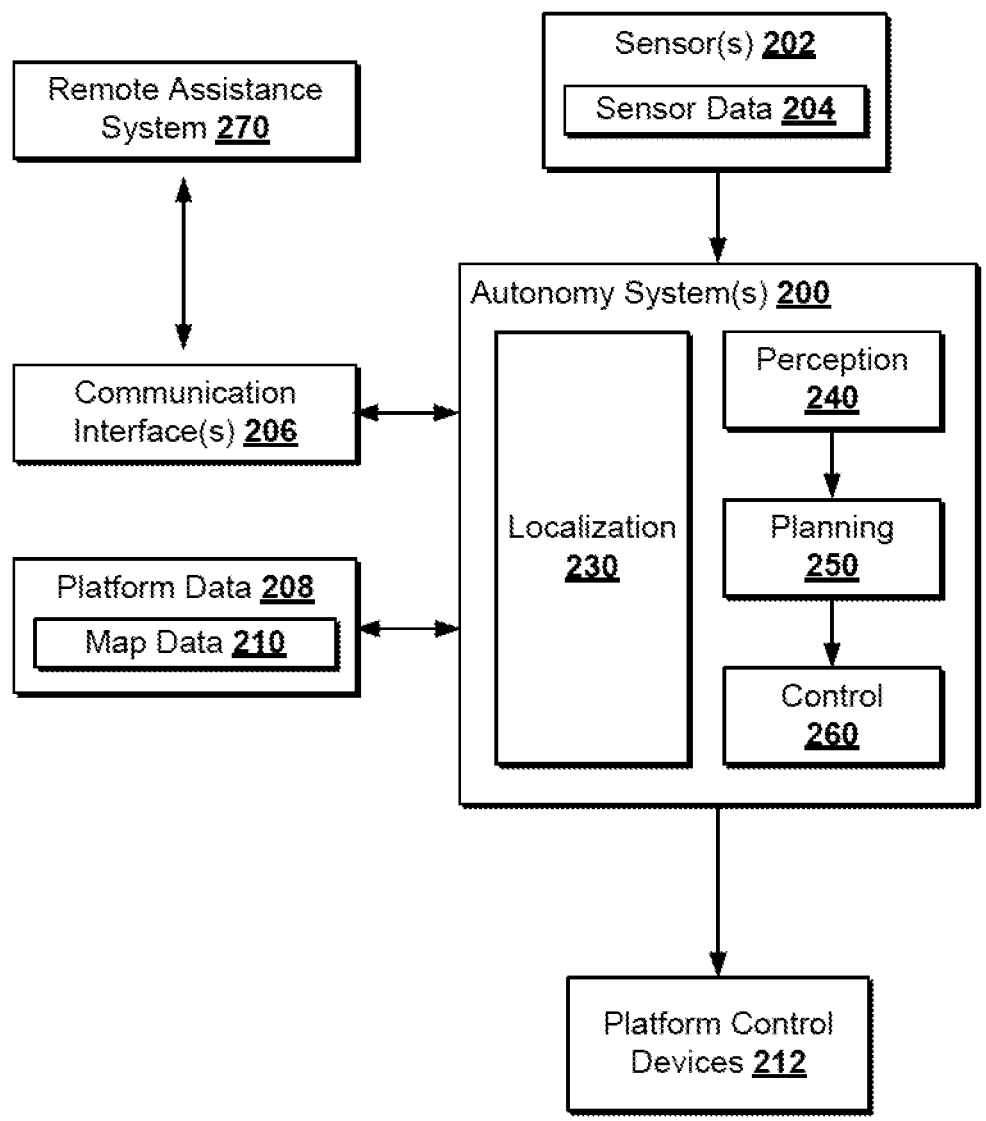
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned model. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning subsystem 250. Additionally or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
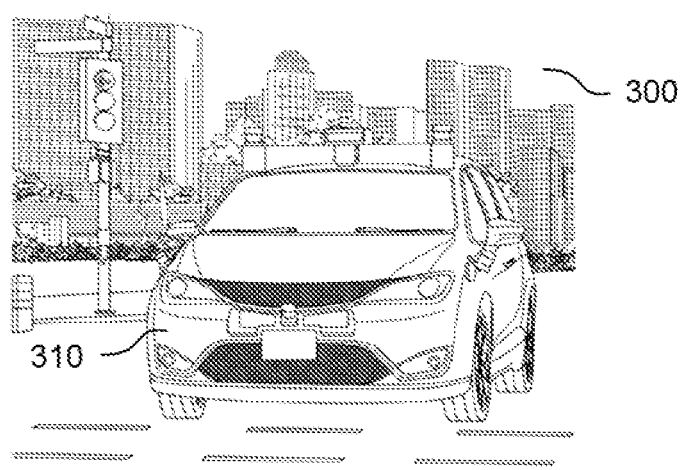
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
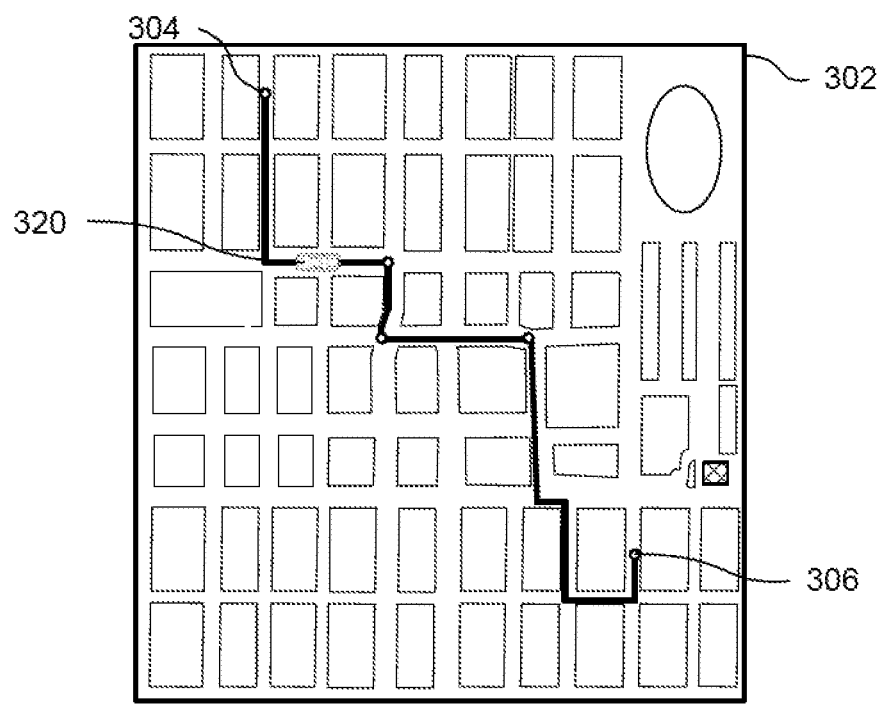
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
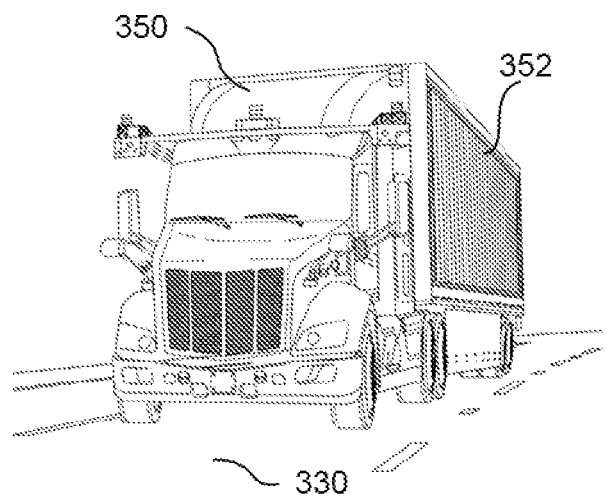
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
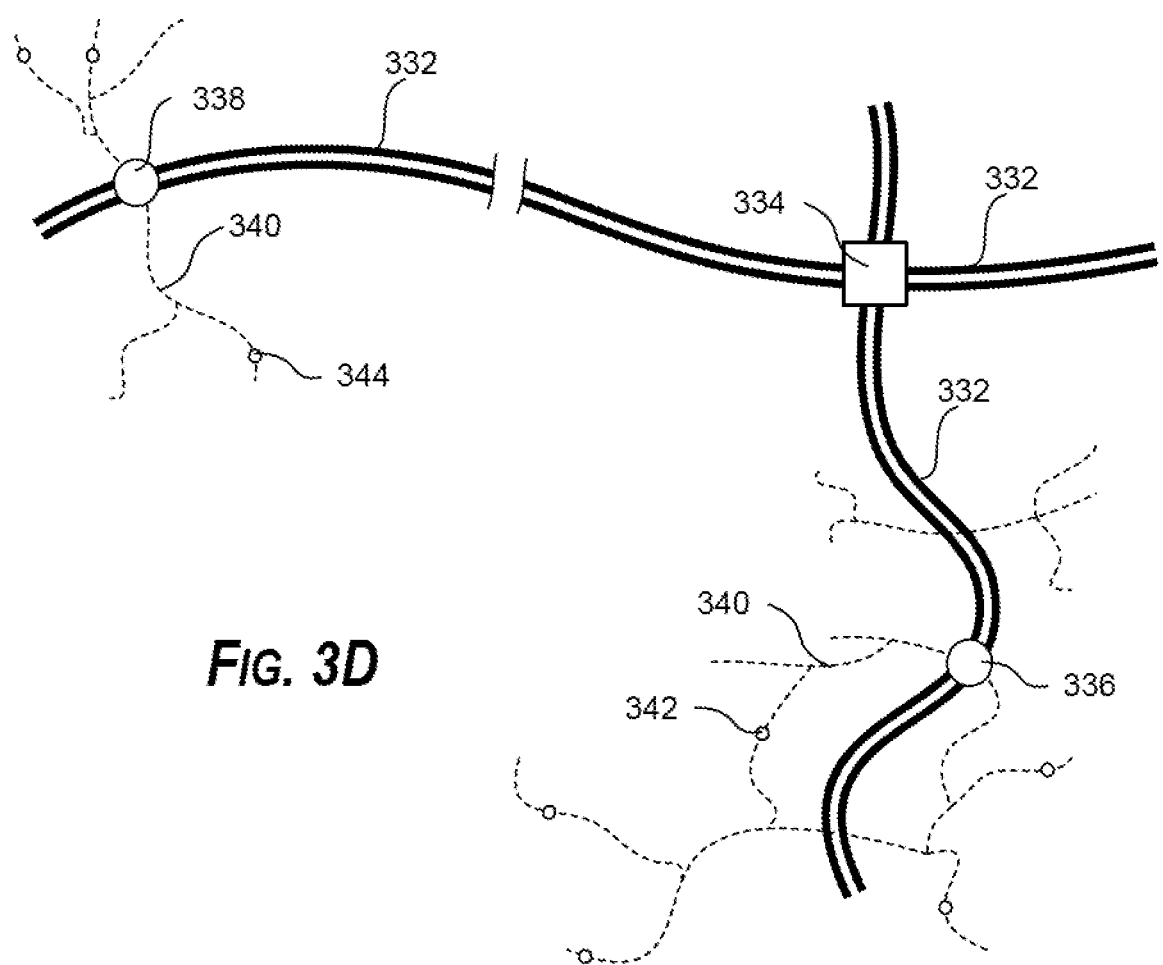
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To help improve the performance of an autonomous platform, such as an autonomous vehicle controlled at least in part using autonomy system 200 (e.g., the autonomous vehicles 310 or 350), the planning system 250 can implement a multistage planning system according to aspects of the present disclosure.

Figure 4:
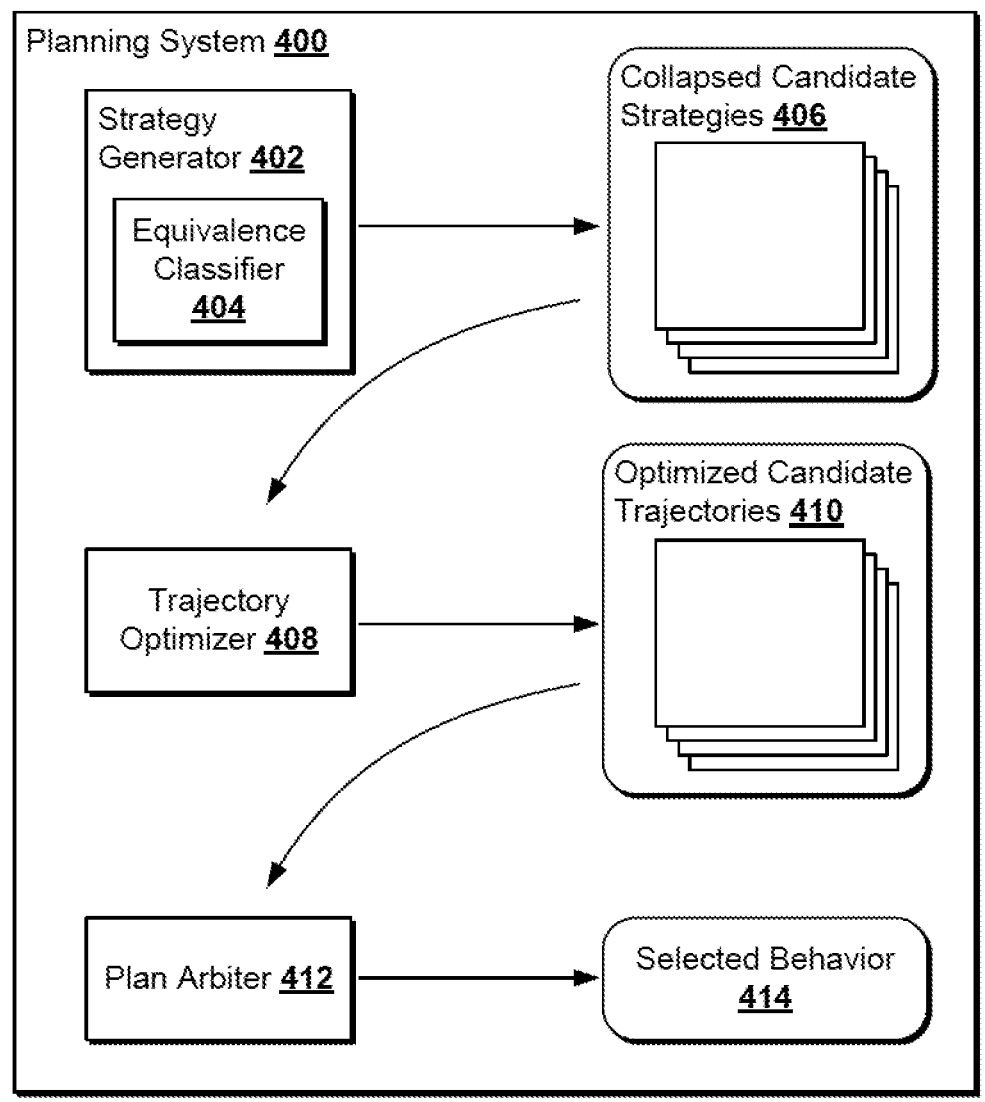
FIG. 4 is a block diagram of an example system for performing multistage planning, according to some implementations of the present disclosure.

FIG. 4 is a block diagram of an example planning system 400 for an autonomous vehicle (e.g., an example implementation of a planning system 250 that performs multistage planning according to example aspects of the present disclosure). The example planning system 400 can include a strategy generator 402 for generating collapsed candidate strategies 406 (e.g., as a first stage). A trajectory optimizer 408 can map one or more of (e.g., a subset of, the entirety of) the collapsed candidate strategies 406 to a set of optimized candidate trajectories 410 (e.g., as another stage). For instance, given a candidate strategy, the trajectory optimizer 408 can generate a trajectory that optimally executes the discrete decisions associated with that candidate strategy. A plan arbiter 412 can decide which of the optimized candidate trajectories 410 to execute. For instance, the plan arbiter 412 can select an optimal {strategy, trajectory} pair. The plan arbiter 412 can output selected behavior 414.

Although FIG. 4 illustrates an example implementation of a planning system 400 having various components, it is to be understood that the components can be rearranged, combined, omitted, etc. within the scope of and consistent with the present disclosure.

The strategy generator 402 can be configured to construct a search space of candidate strategies for the autonomous vehicle to execute. For example, a search space of candidate strategies can include an enumeration of some or all possible sets of discrete decisions the autonomous vehicle can make in a road scenario over a given time frame. The task of navigating a road scenario can be approached by assembling a set of operational choices that admit a limited set of possible responses. Selection of a particular response can be considered a discrete decision. For instance, "yield" and "not yield" are discrete decisions. For example, in a road scenario in which an autonomous vehicle is approaching a yield sign, the autonomous vehicle can enumerate a strategy based on the discrete decision to "yield" and a strategy based on the discrete decision to "not yield."

The exponential complexity of the set of all possible combinations of discrete decisions in real-world scenarios can strain computational resources in some situations. To obtain a tractable search space, the strategy generator 402 can use an equivalence classifier 404 to build a search space that reduces the number of strategies to consider. In some implementations, an equivalence classifier 404 can group possible strategies into equivalence classes based on an equivalence criterion. In some examples, the equivalence class(es) can be represented in downstream processing by a representative strategy for the class, or a proxy thereof. In some examples, members of the equivalence classes can inherit one or more properties or characteristics shared by the class.

Some examples of an equivalence criterion can facilitate formation of equivalence classes that share one or more characteristics. For instance, the equivalence classifier 404 can leverage an equivalence criterion configured to identify or classify candidate strategies that share a score, cost, cost function, or other evaluation functions (e.g., a probability distribution, such as a maximum entropy probability distribution, or MaxEnt).

In some examples, the equivalence criterion can be satisfied by a common set of constraints, or a set of constraints dominated or superseded by a particular constraint. In some implementations, the equivalence classifier 404 obtains one or more equivalence classes based on particular discrete decisions that do not effectively alter an outcome or evaluation of strategies that include those particular discrete decisions. The particular discrete decisions that do not effectively alter the outcome can be omitted from the search space, or otherwise grouped with other decisions or strategies that would effectively share the same evaluation.

For example, optimizing a trajectory for executing a given strategy can include optimizing an evaluation function. In some examples, the evaluation function can provide an optimization surface defined over a space of all possible actions, movements, etc. In some examples, the evaluation function can provide an optimization surface defined over a space of a subset of possible actions, movements, etc. For instance, a given strategy can point to a particular basin of the optimization surface, such that the evaluation function can be locally defined based on the subset of discrete decisions associated with the given strategy. When different strategies point to the same basin of the evaluation surface, the optimization task can effectively be the same. In this manner, for example, collapsing the search space into classes of strategies that satisfy an equivalence criterion can provide for more efficient determination of distinct candidate trajectories by decreasing unnecessary duplication of optimization effort.

For example, a goal for evaluating candidate strategies can be to output strategies and trajectories that are similar to what a human exemplar would execute in the same scenario (e.g., an expert-based learning objective). Thus, an evaluation surface can be a MaxEnt distribution for sampling probable actions and movements. Accordingly, a group of strategies that share a MaxEnt distribution can lead to the same sampled actions or trajectories. In this manner, for example, classifying and grouping effectively equivalent strategies can substantially streamline processing of candidate strategies by distilling the search space to a set of candidate strategies that provide for distinct solutions. Furthermore, computation of one optimization can be efficiently propagated to the entire class.

In some implementations, a characteristic associated with a particular decision in a set of decisions can dominate an aggregate characteristic of the entire set. For instance, a cost or penalty associated with not yielding to a red traffic signal can be so high as to dominate the cost determination, regardless of what various decisions are possible with respect to objects beyond the traffic signal. In this manner, for example, the scope of possible decisions that could be made can be reduced to consider a representation of an equivalence class of strategies that all share the dominating feature of not yielding to the red traffic signal. In this manner, the planning system 250 need not conduct further processing over the various other members of the equivalence class based on the prior determination that the members would all effectively be characterized by a common cost, score, etc.

The strategy generator 402 can collapse possible strategies in the search space based on constraint domination. The collapse of strategies can refer to the treatment of factually different strategies as effectively the same from an evaluation (e.g., cost) perspective. In general, in some examples, two decisions or states can compare as equivalent if the constraints of one do not change the cost function if merged with the other's constraints. For instance, a constraint can dominate another when the constraint is more constraining than the other (e.g., more constraining for some parameters, for all parameters, etc.). For example, a constraint can dominate if it is associated with an equal or more constraining time range, arclength range, acceleration backup, costing weight (e.g., a product of a constraint weight and a configuration weight, etc.), and the like. In some examples, constraint domination can be based on a soft cost computed by a machine-learned costing model. In some examples, constraint domination can be based on a hard cost (e.g., a binary flag) assigned according to a heuristic technique.

Some examples of an equivalence criterion can include a threshold-based criterion. For instance, a set of strategies having different discrete decisions can be grouped together in an equivalence class if an associated characteristic (e.g., cost, score, etc.) associated with the points of difference (e.g., the differentiating discrete decisions) are within a threshold distance of each other. Additionally or alternatively, different strategies can be collapsed together if one or more of the differentiating decisions that otherwise may have differentiated the strategies has a probability of occurrence below some threshold value (e.g., the probability of occurrence based on a combination of constraints operating on that decision, etc.). In some examples, a probability of occurrence or other value can be predicted by a machine-learned model for a given decision. In some examples, based on a likelihood associated with a particular decision for the autonomous vehicle when faced with a given decision point, the strategy generator 402 can determine not to further explore a distinct set of possible strategies that are differentiated by that particular decision. In this manner, a search space of candidate strategies can be further collapsed.

Some examples of an equivalence criterion can include a logical feasibility criterion. For instance, a set of strategies having different discrete decisions can be grouped together in an equivalence class if the implementation of one of the decisions logically forecloses or requires another. For instance, a decision to yield to a red traffic signal can logically provide for yielding to a crosswalk on the far side of the intersection. In this manner, for instance, candidate decisions that include yielding to the traffic signal need not be internally distinguished by the response to the decision of whether to yield to the crosswalk. In this manner, for instance, the candidate strategies can be collapsed into an equivalence class.

A particular decision or group of decisions (e.g., a strategy) can be associated with a feasibility cost. The feasibility cost can reflect an evaluation of an ability to satisfy a set of constraints associated with a given strategy. For instance, a set of constraints can be similarly or equally important, such that all the constraints in the set are desired to be met (e.g., without compromise, with minimal compromise, etc.). A feasibility cost can be assigned based on a determination of whether there exists a possible trajectory such that all the constraints can be met. In some examples, the feasibility cost can include a margin value indicating a margin of constraint satisfaction (e.g., a buffer region) or a margin of constraint violation (e.g., an amount of violation). Constraint feasibility (e.g., joint constraint feasibility of a group of constraints) can correspond to a "goodness" evaluation of a set of discrete decisions.

The feasibility costs can be used as a termination parameter for the search space construction. For instance, states can be expanded (e.g., by following decisions that move to another state) based on the feasibility of the decisions available at that state. A feasibility cost can be determined based on a combination of the parent state from which the decision is made and the child state which results from the decision being made (e.g., based on a difference of a cost associated with each). In this manner, for instance, growth of the graph can be terminated.

The feasibility costs can be used as a termination parameter for the strategy search. For instance, the strategy generator 402 can output a set of candidate strategies 406 based on feasibility costs associated therewith. In some examples, the strategy generator 402 can output a set of top K candidate strategies based on their respective feasibility costs, or output all candidate strategies (e.g., computed within a computational budget) except infeasible strategies, or all candidate strategies (e.g., computed within a computational budget) along with their respective feasibility cost(s).

A feasibility cost can be determined by mapping a set of constraints under consideration to a multidimensional space. For instance, a feasibility determination can be performed based on one or more constraints and an initial condition. The constraints can be mapped to corresponding regions in the multidimensional space. For instance, the multidimensional space can be a distance-time space, such that distance-at-time constraints can be mapped to lines or areas in the distance-time space. The existence of a feasible trajectory can be determined by charting a continuous trace around the mapped constraints, while conforming the trace itself to any additional constraints (e.g., speed or acceleration constraints). If a trace exists that satisfies the constraints (e.g., completely, or within acceptable margins, etc.), the set of constraints can be feasible. In some examples, the margins between the trace and the boundaries of the constraints (e.g., clearance margins until intersection, violation margins beyond intersection, including the maximum or minimum of each, etc.) can provide a feasibility cost associated with the set of constraints. Similarly, the margins (indicating clearance or violation) of speed and acceleration constraints can also be determined, such as by evaluating the slope or curvature of the trace.

In some examples, feasibility costs can be determined hierarchically. For example, individual constraints can be evaluated with respect to an initial state. For instance, a margin can be directed computed for an individual distance-at-time constraint given a set of minimum or maximum speed-at-time values and minimum or maximum acceleration values. Thus, the feasibility of individual constraints can be directly computed. For combinations of constraints (e.g., upper and lower distance-at-time constraints, etc.) over time, the margins can be computed based on the minimum or maximum position of the autonomous vehicle when arriving at a later constraint based on the minimum or maximum speed or acceleration when leaving an earlier constraint. At the strategy level, a margin selected from the individual margins or the combination-based margins can be used to determine the feasibility cost of the strategy. For instance, a feasibility cost of a strategy can be based on a minimum clearance margin or a maximum violation margin among all the individual constraints and combination constraints.

The search space of candidate strategies can be explored using a graph structure. A diagram of an example graph structure 500 is provided in FIG. 5. The following describes the graph structure and its related functionality and processing. FIGS. 6A and 6B then provide an example implementation of such graph structure for autonomous vehicle motion planning within an operational environment.

Figure 5:
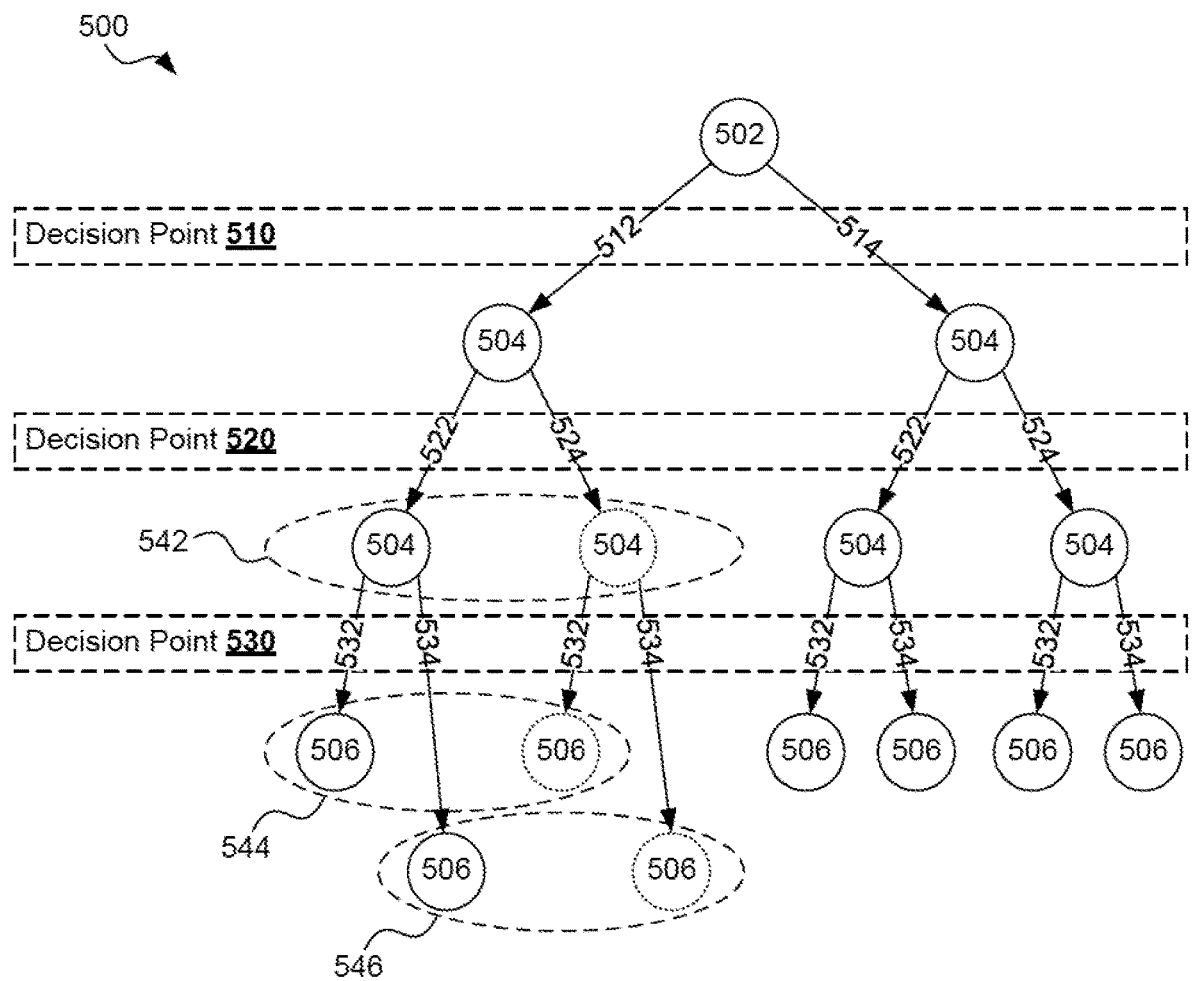
FIG. 5 is a diagram of an example graph structure for performing multistage planning, according to some implementations of the present disclosure.
Figure 6A:
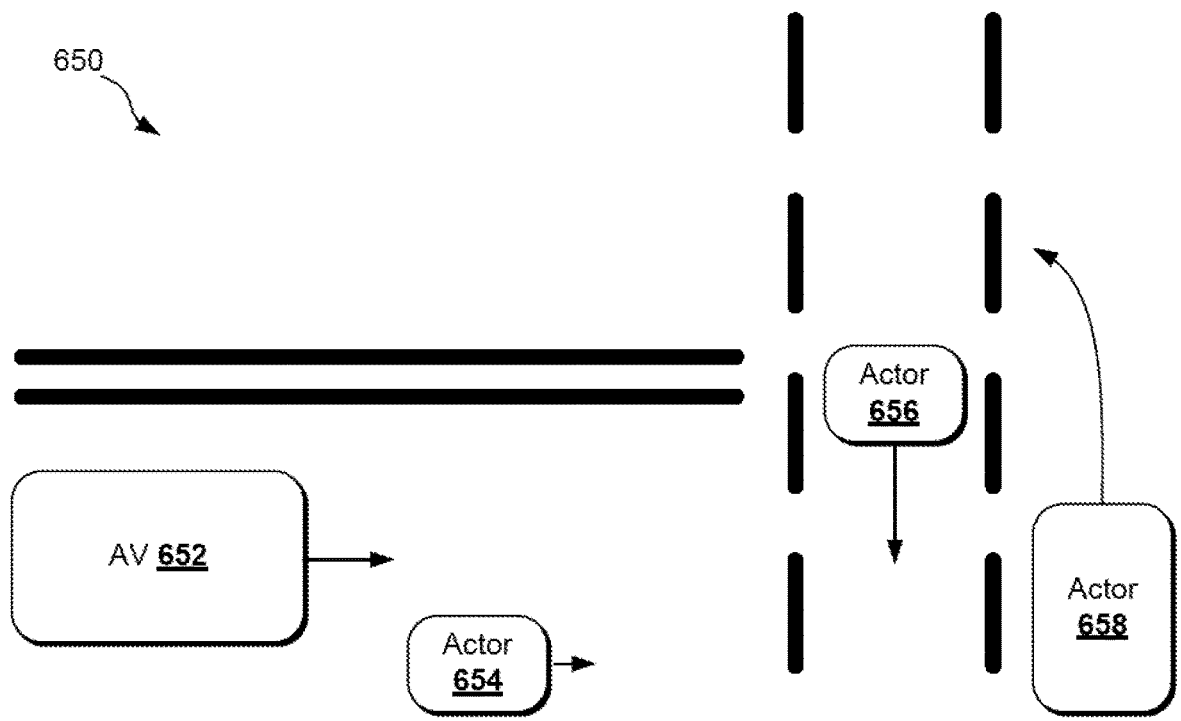
FIG. 6A is a block diagram of an example operational scenario, according to some implementations of the present disclosure.
Figure 6B:
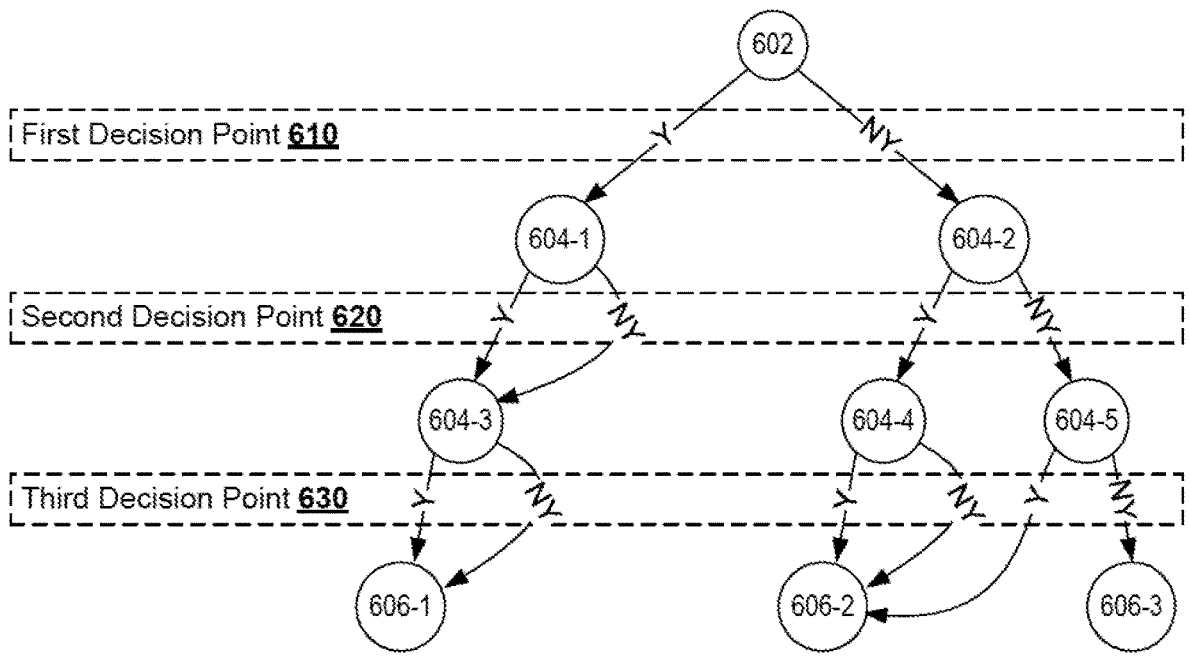
FIG. 6B is a diagram of an example graph structure for performing multistage planning in the example operational scenario of FIG. 6A, according to some implementations of the present disclosure.

As shown in FIG. 5, the graph can include a root node 502, internal state nodes 504, and leaf nodes 506. In some examples, the root node 502 provides a starting point from which decisions are made. For instance, a first decision point 510 (e.g., with respect to a first object) provides two discrete decisions 512 and 514 that each create a branch of the graph structure. Each of the discrete decisions 512 and 514 lead to an internal state node 504 that captures an internal state associated with the set of decisions to that point (e.g., a strategy, such as a partial strategy). A second decision point 520 (e.g., with respect to a second object) also presents two discrete decisions 522 and 524 within each of the branches (e.g., the branches extending from discrete decisions 512 and 514). A third decision point 530 (e.g., with respect to a third object) also presents two discrete decisions 532 and 534 within each of the sub-branches extending from the respective discrete decisions 522 and 524 from the preceding set of internal state nodes 504. Each leaf node 506 thus culminates from a unique combination of different discrete decisions that trace a path from the leaf node 506 to the root 502. In this manner, for instance, a strategy can define a path from a leaf node 506 to the root. In this manner, for instance, a respective leaf node 506 can be correspond to a respective candidate strategy.

The internal state nodes 504 and the leaf nodes 506 can correspond to a set of decisions leading to the node (e.g., edges of the graph) and any constraints associated with the set of decisions. For example, the node(s) can correspond to a depth indicator and a set of constraints associated with the path taken from the root to the node(s).

In some examples, one or more states can be collapsed together (e.g., effectively becoming the same node). For instance, a group 542 can associate a group of internal state nodes 504 that satisfy an equivalence criterion based on the strategy up to that point. Based on satisfying the equivalence criterion, the internal state node 504 illustrated with a dashed border can inherit or share one or more characteristics (e.g., a costing function or other evaluation function) of the group 542. Because the internal state nodes 504 in the group 542 collapse together (e.g., effectively become the same node), the collapse can be propagated downstream, such that the equivalence classes 544 and 546 form (e.g., because decisions flowing from an equivalent state can be equivalent, further reducing the size of the graph).

The strategy generator 402 can generate a graph (e.g., graph 500) in a collapsed state. For instance, the graph 500 need not be fully enumerated with all candidate strategies before a subsequent collapse procedure. For example, as an edge is traversed within the graph, the state change from the origin state to the destination state (e.g., from a root node 502 to an internal state node 504, from an internal state node 504 to another internal state node 504, from an internal state node 504 to a leaf node 506, etc.) can involve determining a change in a set of constraints associated with the change in state from the parent node to the child node. If the set of constraints do not change, or the change in the constraints do not affect a total cost (e.g., cause an effect within a threshold, cause any effect, etc.), then, instead of propagating growth of the graph 500 along a new branch, the graph can instead collapse future growth into fewer branches.

Similarly, as an edge is traversed within the graph, the state change from the origin state to the destination state can involve a feasibility determination. For instance, the strategy generator 402 can perform a feasibility determination by estimating whether there is a feasible solution that satisfies every constraint associated with both the parent node and the possible child node. For example, the constraints under consideration can map to constraint areas in a multidimensional space, such as a distance-time space. The existence of a continuous path traceable across the multidimensional space without intersecting the constraint areas can indicate a feasibility of a strategy including the constraints of the respective nodes. The strategy generator 402 can implement the feasibility as a hard cost, for example, such that infeasible strategies include high costs. In some implementations, the margins between the continuous path and the constraint areas can provide an estimate of the solution margins (e.g., margins to constraint failure, etc.). In some implementations, the margins can provide a goodness value for a soft cost for evaluating a strategy (e.g., for discriminating among feasible strategies). If there is a feasible solution associated with the possible child node, the graph can be expanded to include that node. If there is not a feasible solution (e.g., a feasibility cost failing to meet a desired threshold), the possible child node can be pruned such that the graph is not expanded to include that possible child node, or not expanded to grow past that child node.

In some examples, constraints (e.g., associated with nodes of the graph 500) can pool as the graph 500 is expanded and grown. For example, the constraints from each of discrete decision 512 of decision point 510 and discrete decision 522 of decision point 520 can combine together in a constraint pool for evaluating a total set of constraints. If the pooled constraints satisfy an equivalence criterion with a pool containing the constraints from each of discrete decision 512 of decision point 510 and discrete decision 524 of decision point 520, then the group 542 can merge (e.g., a single node can be added to represent the group 542).

The strategy generator 402 can compare constraints from a parent node with constraints from a child node (e.g., pairwise). For instance, an internal state node 504 can correspond to a set of constraints built from the pooled set of preceding discrete decisions that led to that node. When determining whether to branch the graph along a new decision edge to a new child node, the strategy generator 402 can compare the constraints of the parent node to the constraints of the child node to determine whether the constraints of the parent node dominate the constraints of the child node reachable along that edge. If so, then the edge may not effectively change the constraint pool, and the graph can collapse by pruning the new child node (e.g., by not adding the new child node to the graph).

The strategy generator 402 can sort the decisions used for constructing the graph (e.g., decisions 510, 520, 530). For instance, the strategy generator 402 can sort the decisions based on the likelihood of dominating respective constraint pools. For example, the strategy generator 402 can base the likelihood on how "constraining" the decisions can be on successive nodes of the graph. In some implementations, the strategy generator 402 can sort the decisions from most to least constraining. In this manner, for instance, decisions near the root 502 can have a higher likelihood of dominating successive decisions, causing greater portions of the graph 500 to collapse for a more compact search space.

Further examples are discussed with respect to FIGS. 6A and 6B. FIG. 6A is a diagram of an example traffic scenario 650 in which an autonomous vehicle 652 is moving through an environment that also contains a number of objects (e.g., actors), including actor 654, actor 656, and actor 658. To plan a path through the environment, the autonomous vehicle 652 can generate candidate strategies.

As illustrated in FIG. 6B, the strategy generator 402 can structure the candidate strategies around discrete decisions made with respect to the objects. This can include a first decision 610 to Yield or Not Yield with respect to the actor 654, a second decision 620 to Yield or Not Yield made with respect to the actor 656, and a third decision 630 to Yield or Not Yield made with respect to the actor 658.

In generating the graph structure, the strategy generator 402 can pool the constraints as discussed above. For instance, the autonomous vehicle 652 may associate a first distance at time (DAT) constraint with yielding to the actor 654 and a second DAT constraint with yielding to the actor 656. The internal state node 604-1 can correspond to the first DAT constraint based on traversing the Yield edge from the root 602. In the generation of the successors to node 604-1, the strategy generator 402 can pool the additional constraints associated with the successive discrete decisions. For instance, the second DAT constraint can correspond to traversing the Yield edge from node 604-1 to 604-3.

However, in some examples, when pooled with the first DAT constraint, the second DAT constraint may not affect an evaluation function associated with the current state. For instance, the second DAT constraint can be less constraining than the first DAT constraint, for example because the actor 654 can be nearer to the autonomous vehicle 652 than the actor 656, or the actor 654 can be assigned a higher weight or priority than the actor 656, etc. Thus, in some examples, the Yield and Not Yield edges emanating from 604-1 can both intersect 604-3, since traversal of either edge would lead to an equivalently costed state. The same approach can be applied to the third decision 630 to arrive at leaf node 606-1.

Similarly, the same approach can be applied to all the decisions flowing from the Not Yield branch off the root node 602. For instance, when not yielding to the actor 654, the discrete decisions to yield or not to yield to actor 656 can have an appreciable impact on the cost associated with the decision options. For instance, absent the first DAT, the constraint pool may only include whatever constraints flow from the decision with respect to the actor 656 (e.g., the second DAT), such that the different discrete decisions may not be collapsed together. The same approach can be applied to the third decision 630 to arrive at leaf nodes 606-2 and 606-3 based on the pooled costs associated with the discrete decisions available for each decision point.

The leaf nodes 606-1, 606-2, and 606-3 can provide equivalence classes, each containing one or more candidate strategies. Accordingly, the graph structure in FIG. 6B can provide three collapsed strategies for further consideration and processing in the planning system 400 (e.g., as opposed to the eight possible strategies based on naïve enumeration). Table 1 provides a logic table tracing the three equivalence classes of strategies in terms of the discrete decisions making up the class.

TABLE 1

Example set of equivalence classes of strategies. Pipes indicate "OR," and vertical adjacency indicates "AND."

|  | $E_1$ | $E_2$ | $E_3$ |
| --- | --- | --- | --- |
| Decision 1 | Y | NY | NY |
| Decision 2 | Y \| NY | Y \| NY | NY |
| Decision 3 | Y \| NY | Y \| NY \| Y | NY |

Advantageously, by collapsing candidate strategies based on pooled constraints, the equivalence classes can each be associated with a different evaluation function (e.g., probability distribution) without undue duplication. For instance, among the eight possible different candidate strategies based on naïve enumeration, there might only be three effectively distinct evaluation functions for computation. Instead of processing all eight candidates, the three distinct evaluation functions can be computed directly from the collapsed candidate strategies without undue duplication of processing effort.

In some examples, members of an equivalence class can correspond to the same or an equivalent distribution, and each equivalence class can correspond to a distinct distribution. For instance, the planning system 400 can obtain a distribution of one or more characteristics associated with a set of constraints in the search space. The strategy generator 402 can collapse the search space so as to obtain equivalence classes that provide representative examples of the respective distributions. In this manner, for example, the strategy generator can assemble a plurality of candidate strategies that concisely present a number of distinct alternatives that would yield different outcomes (e.g., based on the distributions).

For instance, in some examples, the equivalence classes can respectively correspond to different probability distributions. An example probability distribution can be a maximum entropy probability distribution computed based on the constraints associated with the equivalence class. For instance, pooled constraints used to determine the candidate strategy can be used to generate the distribution. In some implementations, the distributions can correspond to a likelihood of occurrence (e.g., a likelihood that a human exemplar would execute a strategy associated with that distribution). In some implementations, the distributions can correspond to cost distributions (e.g., a parameterized costing function over a range of parameter values).

With reference again to FIG. 4, the planning system 400 can include one or more machine-learned components. For instance, any one or all of the strategy generator 402, trajectory optimizer 408, and plan arbiter 412 can include one or more machine-learned components. For instance, the strategy generator 402 can leverage a learned prioritization component to prune the search space of strategies. For instance, a learned prioritization component can predict a value associated with a discrete decision and, based on the value, deprioritize a portion of the search space differentiated by that discrete decision (e.g., terminate growth of a branch of a graph structure from that decision edge).

The equivalence classifier 404 can include one or more learned components. For instance, the equivalence classifier 404 can determine whether constraint(s) associated with a parent node dominate the constraint(s) of a potential child node. For instance, the equivalence classifier 404 can learn to predict the effect of a particular discrete decision on the outcome (e.g., overall evaluation, such as a cost function or distribution) of a particular strategy. Based on this prediction, for example, the equivalence classifier 404 can group multiple decision paths together that would effectively provide the same or equivalent outcome.

The planning system 400 can include a strategy ranker. The strategy ranker can be a standalone system in the planning system 400, or the strategy ranker can be included in one of the components of the system (e.g., within the strategy generator 402 or trajectory optimizer 408) For instance, a strategy ranker can order a number of candidate strategies based on one or more values or objectives. The one or more values or objectives can correspond to a likelihood associated with the candidate strategy (e.g., estimated or actual, such as by reference to an expert actor in the same scenario), a hard or soft cost associated with the candidate strategy, combinations thereof, etc. For instance, the strategy ranker can receive, as an input, the margin(s) determined from a feasibility determination (e.g., using a multidimensional space as described above). In some implementations, the strategy ranker can include one or more learned components. For instance, the strategy ranker can be or include a machine-learned model trained to predict a rank or ranking value for the candidate strategies based on one or more input features descriptive of the candidate strategies.

The strategy ranker can rank exemplar strategies that represent an equivalence class of strategies. The strategy ranker can rank the exemplar based on the exemplar strategy itself. The strategy ranker can rank the exemplar based on one or more other strategies, such as other strategies in the equivalence class. For instance, the strategy ranker can process cost(s) or score(s) associated with the exemplar strategy or other strategies in the equivalence class for determining a rank.

A strategy ranker can be used for additional focusing of the search space of candidate strategies. For instance, the planning system 400 can implement search space focusing in strategy generation (e.g., using strategy generator 402, equivalence classifier 404, etc.). The planning system 400 can also implement search space focusing by selectively optimizing a subset of the candidate trajectories. For instance, a first round can include distilling the search space of candidate trajectories to decrease effectively duplicate strategy options. A second round can include submitting a selected subset of candidate strategies for optimization (e.g., top-K strategies based on various ranking metrics, etc.).

In some examples, focusing the search space occurs implicitly by processing within a computational budget. For instance, a strategy ranker (e.g., within the planning system 400, such as within the strategy generator 402 or trajectory optimizer 408) can rank the candidate strategies for optimization in ranked order. A computational budget can be set such that trajectories can be optimized in order until the budget is met or exceeded. In this manner, the strategy ranker can facilitate triage of computational budgets to prioritize highest-value optimization.

The trajectory optimizer 408 can generate one or more trajectories for one or more of the candidate strategies 406. For instance, the trajectory optimizer 408 determine a trajectory that actually implements or executes the high-level discrete decisions. For instance, the optimized candidate trajectories 410 can include respective optimal trajectories for executing the respective candidate strategies. For example, the constraints and other characteristics of the candidate strategies can determine a cost function within which an optimization technique can be applied to find an optimal trajectory solution. In this manner, for example, optimizing a strategy can include finding a local extrema (e.g., minimum) of a cost surface or basin associated with the strategy (or equivalence class of strategies). An optimal trajectory can be a trajectory that satisfies the constraints associated with the set of decisions of the strategy while decreasing a cost, maximizing a score, etc.

For example, the trajectory optimizer 408 can resolve local optima respectively for the candidate strategies. For instance, a global evaluation surface (e.g., surface of a global costing function) over the domain of all possible strategies can be expensive to compute, complex to define, or pose other challenges (e.g., discontinuities, etc.). Local evaluation surfaces over a domain of a particular candidate strategy can provide for improved efficiency of computation and improved adaptation of the cost functions to achieve desired outcomes (e.g., based on constraints, goals, etc.). In this manner, for instance, the trajectory optimizer 408 can leverage the evaluation functions for the candidate strategies to obtain locally optimized trajectories within a number of distinct basins of a global evaluation surface (e.g., distinct basics obtained by collapsing duplicate-cost strategies using the strategy generator 402) to explore a variety of different individually-optimized options for action.

The plan arbiter 412 can conduct arbitration to select a strategy to execute based on the optimized trajectories 410. For example, the plan arbiter 412 can select a lowest-cost strategy or another strategy based on optimizing a desired value (e.g., a probability, etc.). The plan arbiter 412 can also include one or more validation stages, such as validations based on engineered heuristics (e.g., boundary violations, dynamics violations, etc.). The plan arbiter 412 can also include one or more learned components. For instance, the plan arbiter 412 can be trained to identify and select strategies to optimize a target. For instance, the plan arbiter 412 can be trained to prefer strategies that are most likely to mimic an expert driver (e.g., human driver) driving in the same scenario.

The plan arbiter 412 can output a set of selected behavior 414. The selected behavior 414 can include a selected candidate strategy, a selected trajectory, or both. In some implementations, the selected behavior can be passed to other component(s) and system(s) of the autonomy system 200 for execution by an autonomous vehicle. In some implementations, the selected behavior can be evaluated against a reference or otherwise scored or rewarded for training one or more learnable components of the planning system 400.

Figure 7:
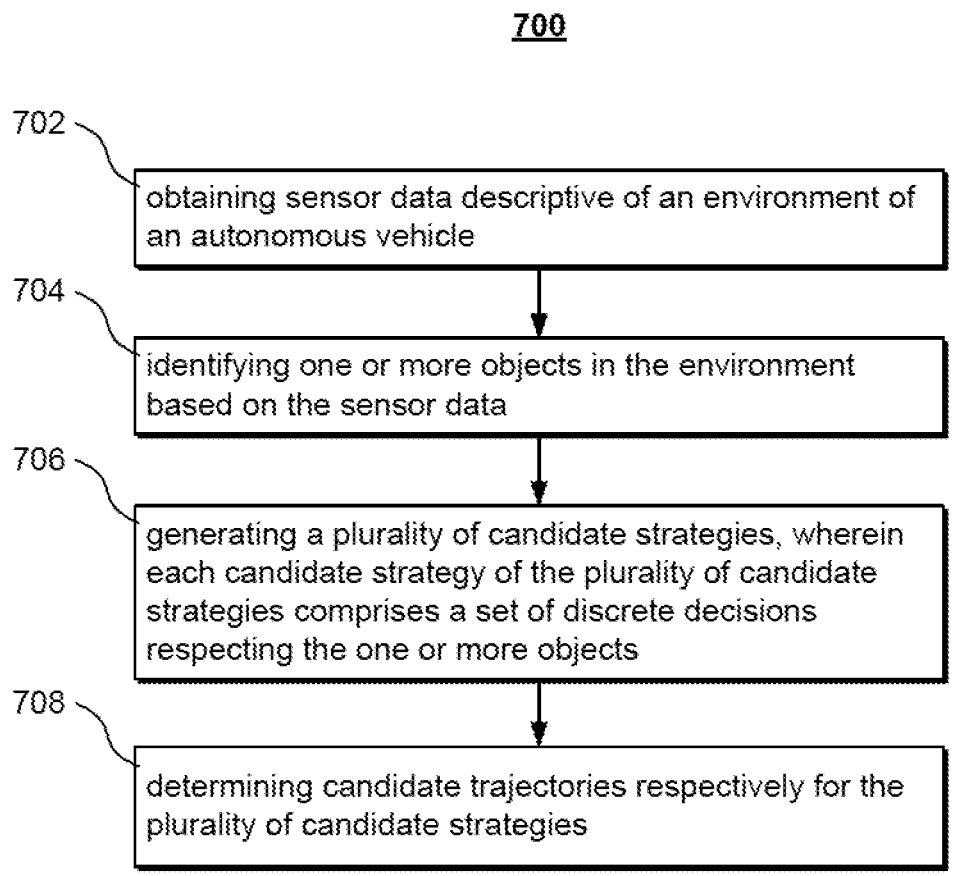
FIG. 7 is a flowchart of an example method for strategy generation, according to some implementations of the present disclosure.

FIG. 7 is a flowchart of a method 700 for performing multistage planning according to aspects of the present disclosure. One or more portion(s) of the method 700 can be implemented by a computing system that includes one or more computing devices such as, for example, the computing systems described with reference to the other figures (e.g., autonomous platform 110, vehicle computing system 180, remote system(s) 160, a system of FIG. 13, etc.). Each respective portion of the method 700 can be performed by any (or any combination) of one or more computing devices. Moreover, one or more portion(s) of the method 700 can be implemented on the hardware components of the device(s) described herein (e.g., as in FIGS. 1, 2, 13, etc.). FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 702, method 700 can include obtaining sensor data descriptive of an environment of an autonomous vehicle.

At 704, method 700 can include identifying one or more objects in the environment based on the sensor data. For instance, a perception system (e.g., perception system 240) can provide for detecting, classifying, and tracking objects in an environment. The perception system can also provide for understanding how objects are positioned within the environment and how objects are moving within the environment. A planning system (e.g., planning system 250, 400) can also forecast how the objects are expected to be positioned or moving within the environment over time. Based on these determinations, for example, the objects can be associated with various constraints (e.g., boundary constraints, motion constraints, etc.). For instance, in an example scenario, the perception system can receive image data and LIDAR data indicating that an upcoming intersection has a traffic signal and a pedestrian moving across a crosswalk on the far side of the intersection.

At 706, method 700 can include generating a plurality of candidate strategies, wherein each candidate strategy of the plurality of candidate strategies includes a set of discrete decisions respecting the one or more objects. For example, a strategy generator 402 can generate the plurality of candidate strategies to explore a collapsed search space of candidate strategies. For instance, as discussed with respect to FIGS. 6A and 6B, a planning system of an autonomous vehicle can reason about discrete decisions to, for example, yield or not yield to various objects in the environment.

Figure 8:
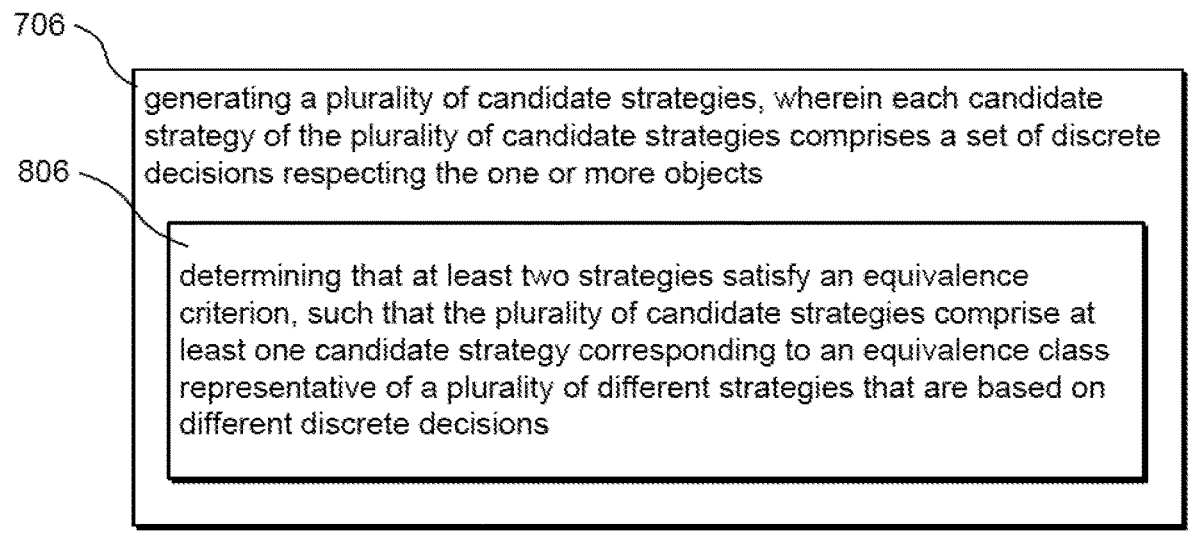
FIG. 8 is a flowchart of an example method for performing multistage planning, according to some implementations of the present disclosure.
Figure 9:
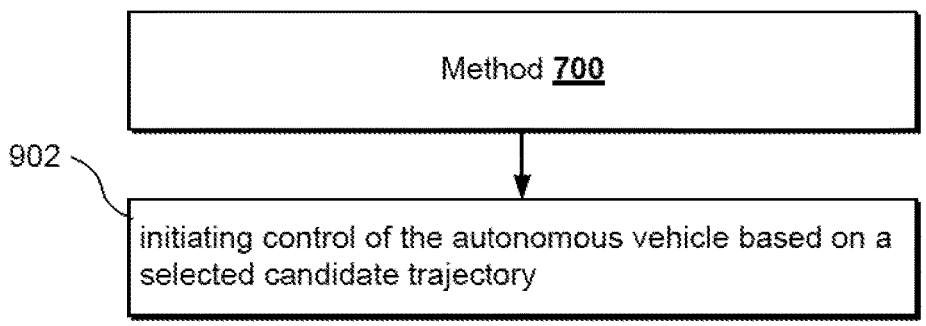
FIG. 9 is a flowchart of an example method for performing multistage planning, according to some implementations of the present disclosure.

In some implementations, to render the search space tractable, method 700 at 706 can include, as shown in FIG. 8, an operation 806 of determining that at least two strategies satisfy an equivalence criterion, such that the plurality of candidate strategies include at least one candidate strategy corresponding to an equivalence class representative of a plurality of different strategies that are based on different discrete decisions.

For example, the constraints associated with the at least two strategies can effectively provide for the same or similar evaluation function, such that, when evaluated, a strategy would not be effectively differentiated from another based on a selection among the at least two strategies to that point (e.g., composed of the set of discrete decisions up to that point). For example, the plurality of different strategies can be characterized by a shared cost function. In some examples, a computing system can determine a cost for the at least one candidate strategy (e.g., the equivalence class), and that cost can be imputed to the plurality of different strategies. In this manner, multiple possible strategies can collapse into an equivalence class that corresponds to a representative strategy, such that a search space can be compactly traversed without duplicating computational effort in the search on distinct strategy candidates.

For instance, in the example scenario, a set of possible strategies can include all combinations of Y and NY for each. But a logical table for the equivalent classes could be as follows:

TABLE 2

Table of equivalence classes for example scenario.

|  | $E_1$ | $E_2$ | $E_3$ |
|---|---|---|---|
| Signal Decision | Y | NY | NY |
| Pedestrian Decision | Y \| NY | Y | NY |

Because yielding to the signal effectively corresponds to yielding to the pedestrian on the far side of the intersection, the decision to yield or not yield to the pedestrian is dominated by the constraint to stop for the signal. Thus, the collapsed search space only has three candidate strategies, as opposed to the four possible strategies.

In some implementations, method 700 at 706 includes generating a graph structure having nodes corresponding to strategy states associated with the plurality of candidate strategies and edges corresponding to the discrete decisions made with respect to the nodes. For instance, example graph structures are discussed with respect to FIG. 5 and FIG. 6B. For instance, example graph structure 500 contains internal state nodes 504 that store or otherwise correspond to strategy states associated with the set of decision edges that connect them to the root 502. The internal state nodes 504, for example, can store or otherwise correspond to constraints associated with the set of decision edges. The constraints can be pooled at each node. The leaf nodes 506 can likewise correspond to strategy states, as they terminate complete paths to or branches from the root 502, representing a complete set of decisions tracing from the root 502, from internal states 504 to internal states 504, and from internal states 504 to leaves 506. In this manner, for instance, the leaf nodes 506 can represent candidate strategies.

A strategy generator can collapse a search space while generating the graph structure. For instance, in some implementations, the strategy generator 402 can determine the plurality of candidate strategies by avoiding low-likelihood nodes while generating the graph structure. For instance, the strategy generator 402 can drop nodes that have a low likelihood of corresponding to expert strategies, as such nodes may not be desired in some implementations.

The graph structure can be collapsed due to constraint domination while the graph is being constructed. For instance, the method 700 can include determining, based on comparison of first constraints associated with a parent node and second constraints associated with a new child node, that the first constraints dominate the second constraints, and deprioritizing the new child node (e.g., not extending a new branch of the graph through that decision edge). In some implementations, the graph structure can include a directed acyclic graph. When two or more decisions satisfy an equivalence criterion based on the strategies up to that point, they can collapse to lead to the same child state (e.g., the edges leading from node 604-1 to 604-3 in FIG. 6B). In this manner, a plurality of incoming edges of the edges of the graph can intersect at least one node of the nodes of the graph. Accordingly, a candidate strategy passing through that node will represent both the collapsed decisions, such that multiple strategies need not be processed to evaluate the effects of that particular decision.

With reference again to FIG. 7, at 708, method 700 can include determining candidate trajectories respectively for the plurality of candidate strategies. For instance, a trajectory optimizer 408 can determine trajectories for a plurality of candidate strategies (e.g., received from the strategy generator 402). For example, in the hypothetical scenario from above, the trajectory optimizer 408 can obtain an optimal strategy for each of the candidate strategies (represented by equivalence classes $E_1$ to $E_3$).

The candidate strategies can be ranked before optimization. In some implementations, the candidate strategies can be distilled based on the ranking prior to optimization. For instance, in the hypothetical scenario, stopping for the signal may be the most likely strategy, while not yielding to either the signal or the pedestrian might be the lowest likelihood. When ranking by likelihood, for example, the result could be a ranked ordering of the candidate strategies in the order of $E_1$ to $E_3$, such that $E_1$ is optimized first. In some examples, for instance, $E_3$ may be deprioritized (e.g., pruned from the search space) if the likelihood is too low, so that the trajectory optimizer 408 need not optimize the strategy of $E_3$.

The trajectory optimizer 408 can determine optimal trajectory(ies) for a candidate strategy based on one or more objectives or evaluation functions. The evaluation function(s) may be the same or different than those used during strategy generation (e.g., by the strategy generator 402). For instance, strategy generation can use a first set of objectives or evaluation functions to focus a search space of candidate strategies. Trajectory optimization can use a second set of objectives or evaluation functions to generate optimal trajectories for executing the candidate strategies. In some implementations, the first set can provide a coarse evaluation, while the second set can provide a finer evaluation (e.g., because it operates over a more limited search space, limited through strategy generation). In some implementations, however, the first set can be the same as or included by the second set.

The output(s) of method 700 can be used for in variety of online and offline implementations. For example, with reference to FIG. 9, in some implementations, initiating control of an autonomous vehicle based on a selected candidate trajectory can be implemented at 902 based on the candidate trajectories determined in method 700. For instance, method 700 can be implemented on a computing system effecting control over an autonomous vehicle, and the autonomous vehicle can execute a motion based on the selected candidate trajectory.

In some offline examples, for instance, the planning system 400 can generate strategies for training probability estimators (e.g., of the planning system 250, 400) based on comparison of the output(s) to reference values. For instance, the planning system 400 can evaluate the output(s) against manually crafted strategies (e.g., based on expert demonstrations), manually labeled log data descriptive of expert navigation of driving scenarios, autolabeled log data descriptive of expert navigation (e.g., collected by one or more sensors deployed in a real-world environment).

Figure 10:
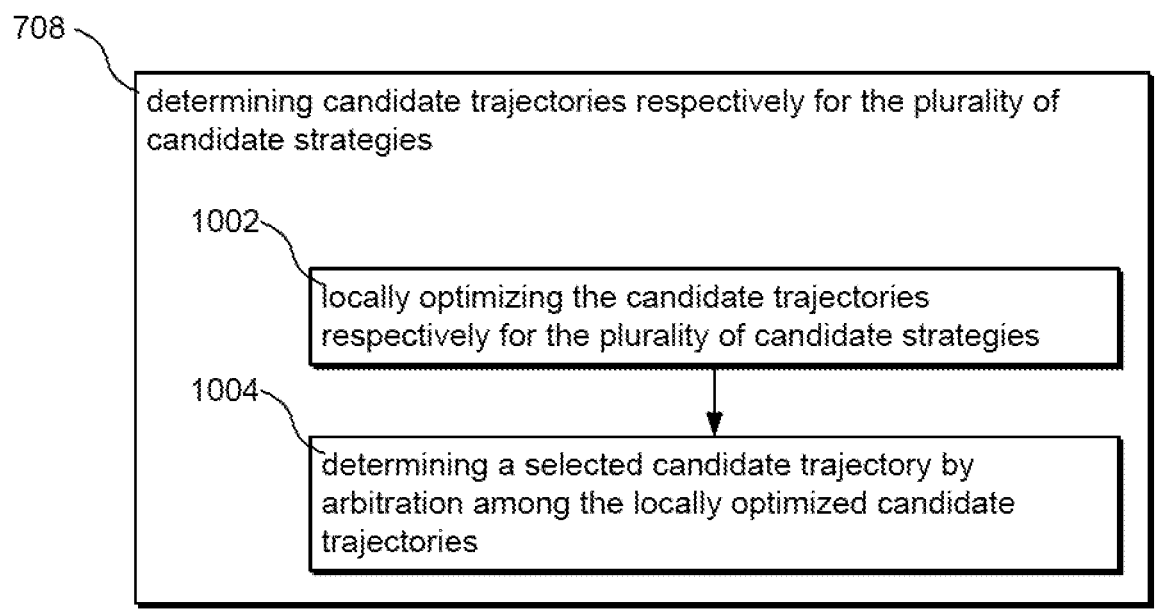
FIG. 10 is a flowchart of an example method for performing multistage planning, according to some implementations of the present disclosure.

With reference to FIG. 10, in some implementations, method 700 at 708 can include, for instance, at 1002, locally optimizing the candidate trajectories respectively for the plurality of candidate strategies (e.g., with trajectory optimizer 408). For instance, in general, determining an "ideal" trajectory can be framed as a global optimization problem over a global cost surface, where the "ideal" trajectory minimizes the cost by searching for the global minimum of the surface. But a global evaluation surface (e.g., surface of a global costing function) over the domain of all possible strategies can be expensive to compute, complex to define, or pose other challenges (e.g., discontinuities, etc.). Local evaluation surfaces over a domain of a particular candidate strategy can provide for improved efficiency of computation and improved adaptation of the cost functions to achieve desired outcomes (e.g., based on constraints, goals, etc.). In this manner, for instance, the trajectory optimizer 408 can leverage the evaluation functions for the candidate strategies to obtain locally optimized trajectories within a number of distinct basins of a global evaluation surface (e.g., distinct basics obtained by collapsing duplicate-cost strategies using the strategy generator 402) to explore a variety of different individually optimized options for action.

At 1004, the method 1000 can include determining a selected candidate trajectory by arbitration among the locally optimized candidate trajectories (e.g., with plan arbiter 412). The plan arbiter 412 can compare one or more features or characteristics of the locally optimized candidate trajectories. For instance, the plan arbiter 412 can compare a total cost, a total probability (e.g., with respect to an expert exemplar), etc. to select behavior for execution. In some implementations, the plan arbiter 412 can perform validation on the trajectories to validate against boundary violations, other constraint violations, etc.

Figure 11:
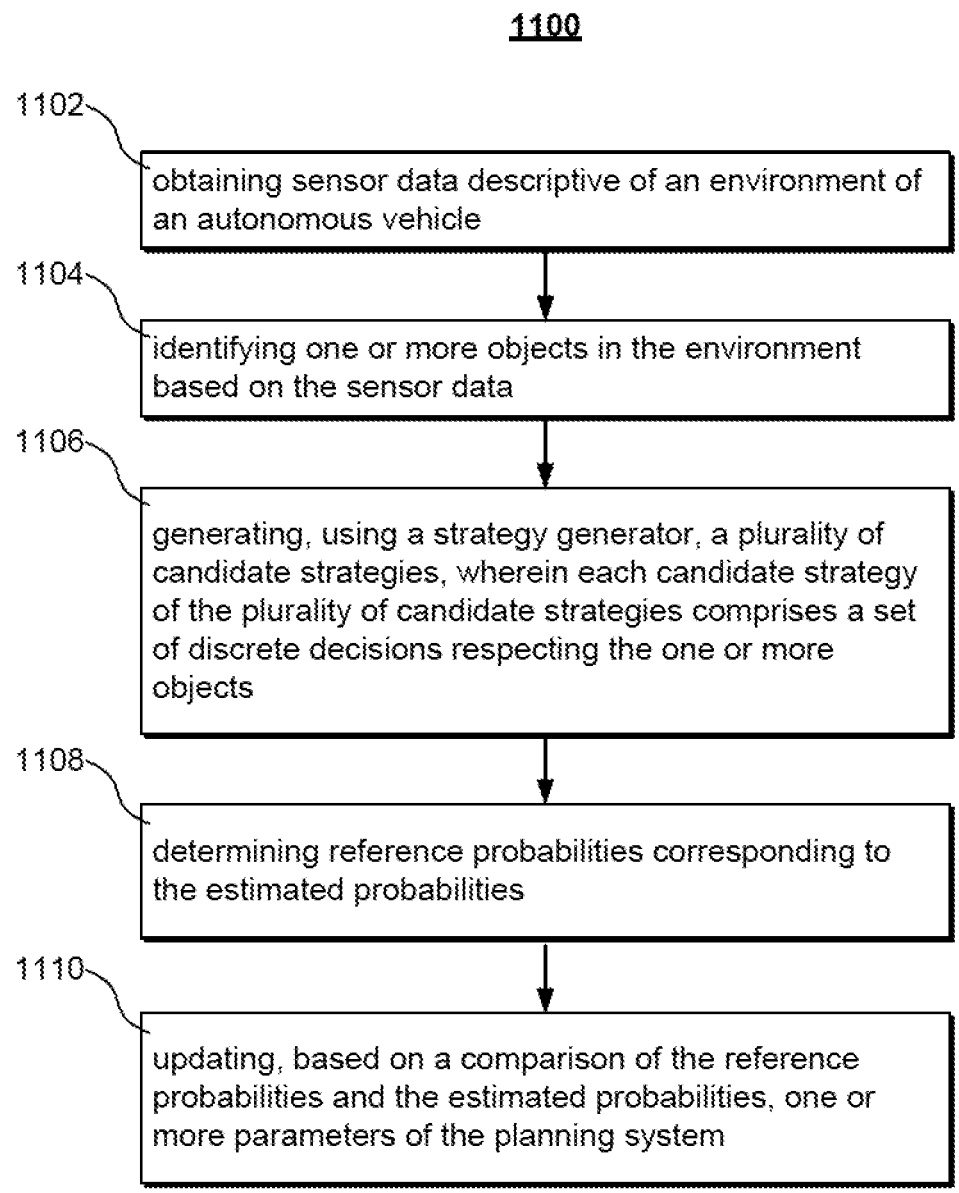
FIG. 11 is a flowchart of an example method for training a multistage planning system model, according to some implementations of the present disclosure.

FIG. 11 depicts a flowchart of a method 1100 for training one or more machine-learned components of a planning system (e.g., planning system 400) according to aspects of the present disclosure. One or more portion(s) of the method 1100 can be implemented by a computing system that includes one or more computing devices such as, for example, the computing systems described with reference to the other figures (e.g., autonomous platform 110, vehicle computing system 180, remote system(s) 160, a system of FIG. 13, etc.). Each respective portion of the method 1100 can be performed by any (or any combination) of one or more computing devices. Moreover, one or more portion(s) of the method 1100 can be implemented on the hardware components of the device(s) described herein (e.g., as in FIGS. 1, 2, 13, etc.), for example, to perform training. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 11 is described with reference to elements/terms described with respect to other systems and figures for exemplary illustrated purposes and is not meant to be limiting. One or more portions of method 1100 can be performed additionally or alternatively by other systems.

At 1102, method 1100 includes obtaining sensor data descriptive of an environment of an autonomous vehicle, and at 1104, method 1100 includes identifying one or more objects in the environment based on the sensor data. In some implementations, the sensor data can be data from physical sensors. In some implementations, the sensor data can be simulated sensor data and the autonomous vehicle can be a simulated vehicle in a simulated environment.

At 1106, method 1100 includes generating, using a strategy generator, a plurality of candidate strategies. Each candidate strategy of the plurality of candidate strategies can include a set of discrete decisions respecting the one or more objects. In some examples, the strategy generator can be configured to generate the plurality of candidate strategies according to the present disclosure. The method can include determining estimated probabilities respectively associated with one or more discrete decisions. For instance, an estimated probability associated with a respective discrete decision can indicate a likelihood of occurrence, such as a likelihood that an expert driver would follow the respective discrete decision. The probabilities can be estimated, for example, by a machine-learned component, such as a learned component of the strategy generator 402.

At 1108, method 1100 includes determining reference probabilities corresponding to the estimated probabilities. For instance, reference probabilities can be determined from ground truth data. Ground truth data can be obtained by manually labeling expert responses to driving scenarios having discrete decisions corresponding to the scenario faced by the autonomous vehicle. In some examples, ground truth data can be obtained by automatically labeling log data detailing expert responses to the driving scenarios. In some examples, expert responses can be revealed through manual takeover or intervention events by human operators of autonomous vehicles.

At 1110, method 1100 includes updating, based on the probabilities, one or more parameters of the planning system (e.g., one or more learned components of the planning system 250, 400, such as a strategy generator, strategy ranker, etc.). For instance, method 1100 can include training a machine-learned component of the strategy generator or the strategy ranker to improve probability estimation. Accurately estimating the probabilities in the search space can improve the ability of the strategy generator to prioritize higher probability branches of the search space. Similarly, accurately estimating the probabilities of candidate strategies can improve the ability of the strategy ranker to prioritize downstream optimization of the higher probability candidate strategies.

In some implementations, the strategy generator can be operated with less aggressive focusing of the search space when training (e.g., when training offline). For instance, less aggressive focusing (e.g., retaining more nodes) can provide for a more expansive search space, providing greater buffer in the event that the strategy generator underestimates the value or goodness of a particular decision branch. By training with greater inclusivity, the strategy generator can be provided with greater amounts of feedback in the training process, thereby more rapidly improving the model performance. Additionally, validating with greater inclusivity can provide more information about the strategy generator's failure modes and can provide better confidence and insight into the strategy generator's performance.

At runtime, however, some implementations can include operating the strategy generator with more aggressive search space focusing. For instance, due to resource constraints (e.g., onboard a vehicle), the search space can be restricted in size, or the search can be restricted in duration. For such reasons, more aggressive focusing may be applied at runtime in an online implementation.

Figure 12:
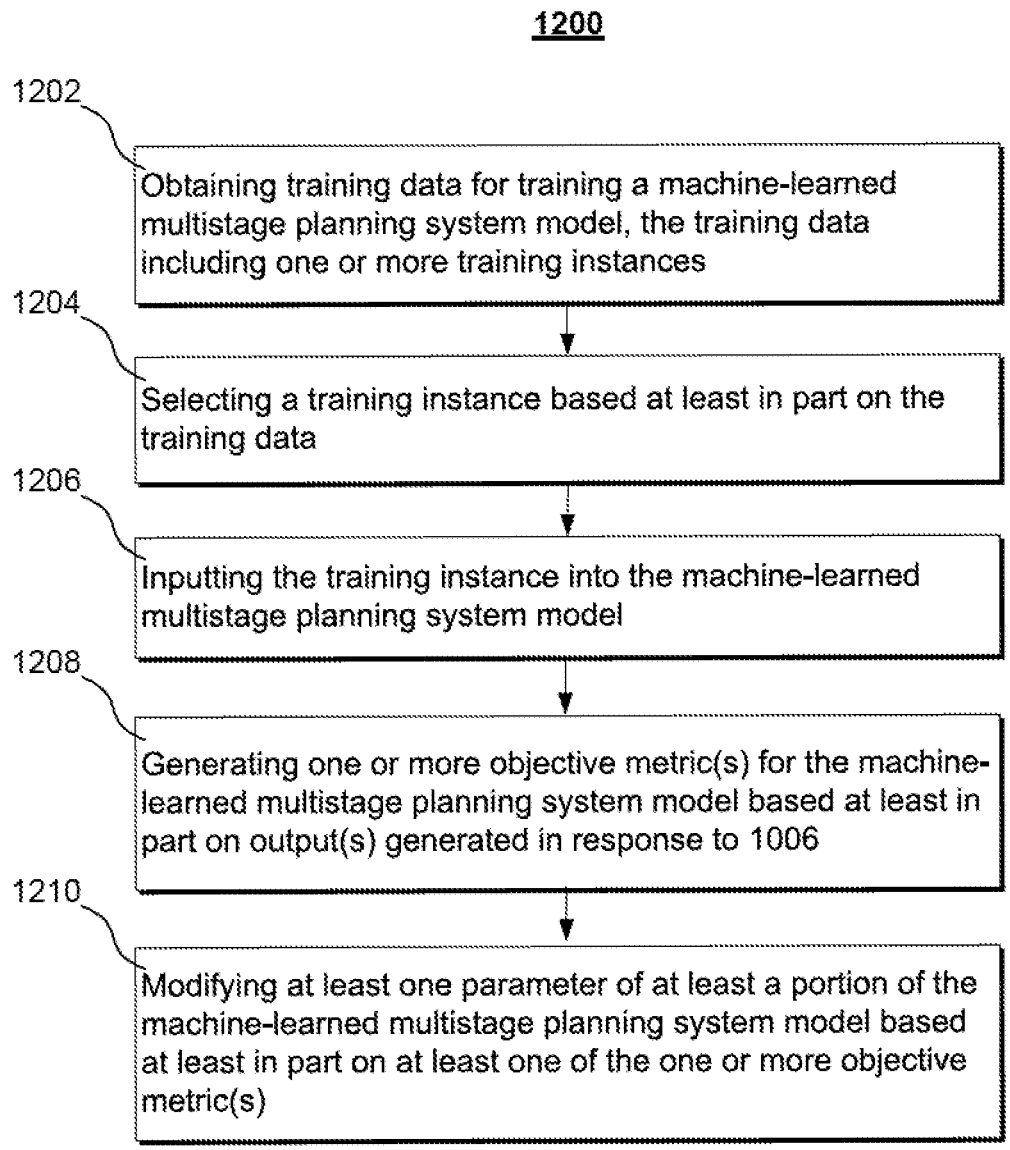
FIG. 12 is a flowchart of an example method for training a machine-learned model for data annotation, according to some implementations of the present disclosure.

FIG. 12 depicts a flowchart of a method 1200 for training one or more machine-learned models according to aspects of the present disclosure. One or more portion(s) of the method 1200 can be implemented by a computing system that includes one or more computing devices such as, for example, the computing systems described with reference to the other figures (e.g., autonomous platform 110, vehicle computing system 180, remote system(s) 160, a system of FIG. 13, etc.). Each respective portion of the method 1200 can be performed by any (or any combination) of one or more computing devices. Moreover, one or more portion(s) of the method 1200 can be implemented on the hardware components of the device(s) described herein (e.g., as in FIGS. 1, 2, 13, etc.), for example, to use sensor data for generating annotations. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 12 is described with reference to elements/terms described with respect to other systems and figures for exemplary illustrated purposes and is not meant to be limiting. One or more portions of method 1200 can be performed additionally, or alternatively, by other systems.

At 1202, the method 1200 can include obtaining training data for training a machine-learned multistage planning system model (e.g., one or more components of model 516). The training data can include a plurality of training instances (e.g., reference planning data, such as labeled trajectories or strategies based on expert demonstrations).

The training data can be collected using one or more autonomous platforms (e.g., autonomous platform 110) or the sensors thereof as the autonomous platform is within its environment. By way of example, the training data can be collected using one or more autonomous vehicle(s) (e.g., autonomous platform 110, autonomous vehicle 310, autonomous vehicle 350, etc.) or sensors thereof as the vehicle(s) operates along one or more travel ways. In some examples, the training data can be collected using other sensors, such as mobile-device-based sensors, ground-based sensors, aerial-based sensors, satellite-based sensors, or substantially any sensor interface configured for obtaining and/or recording measured data.

The training data can include a plurality of training sequences divided between multiple datasets (e.g., a training dataset, a validation dataset, or testing dataset). Each training sequence can include a plurality of pre-recorded perception datapoints, point clouds, images, etc. In some implementations, each sequence can include LIDAR point clouds (e.g., collected using LIDAR sensors of an autonomous platform), images (e.g., collected using mono or stereo imaging sensors, etc.). For instance, in some implementations, a plurality of images can be scaled for training and evaluation.

At 1204, the method 1200 can include selecting a training instance based at least in part on the training data.

At 1206, the method 1200 can include inputting the training instance into the machine-learned multistage planning system model.

At 1208, the method 1200 can include generating one or more loss metric(s) and/or one or more objective(s) for the machine-learned multistage planning system model based on output(s) of at least a portion of the machine-learned multistage planning system model and label(s) associated with the training instances.

At 1210, the method 1200 can include modifying at least one parameter of at least a portion of the machine-learned multistage planning system model based at least in part on at least one of the loss metric(s) and/or at least one of the objective(s). For example, a computing system can modify at least a portion of the machine-learned multistage planning system model based at least in part on at least one of the loss metric(s) and/or at least one of the objective(s).

In some implementations, the machine-learned multistage planning system model can be trained in an end-to-end manner. For example, in some implementations, the machine-learned multistage planning system model can be fully differentiable.

Figure 13:
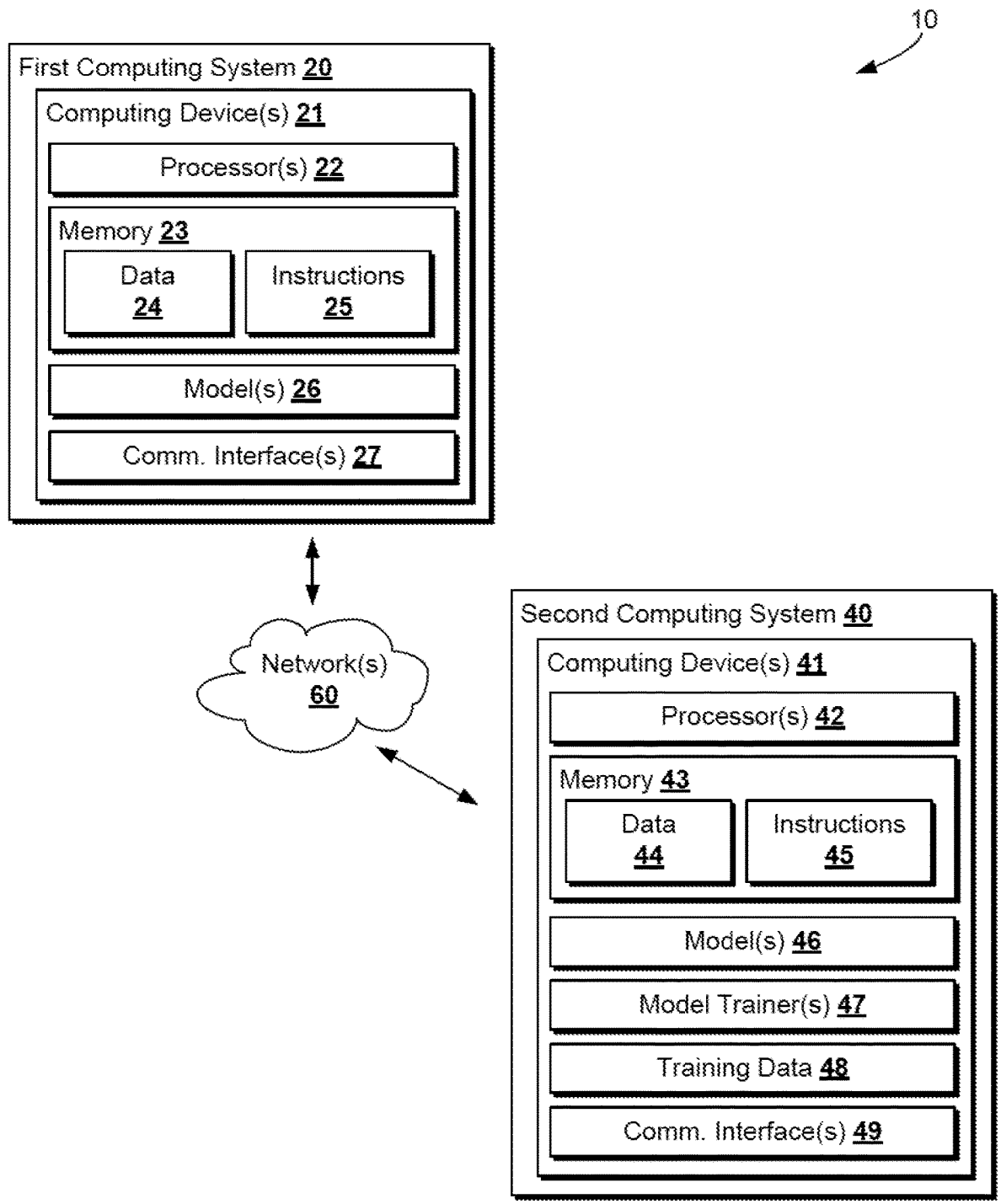
FIG. 13 is a block diagram of an example computing system for performing multistage planning, according to some implementations of the present disclosure.

FIG. 13 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for a multistage planning system (e.g., the remote system(s) 160, the onboard computing system(s) 180, the autonomy system(s) 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include implementing or training a multistage planning system (e.g., as described herein).

In some implementations, the first computing system 20 can store or include one or more models 26. In some implementations, the models 26 can be or can otherwise include one or more machine-learned models (e.g., a machine-learned multistage planning system model, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) $2^1$ or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.). This can also include, for example, implementing or training a machine-learned multistage planning system model.

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. As examples, the model(s) 46 can be or can otherwise include various machine-learned models (e.g., a machine-learned multistage planning system model, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. For example, in some implementations, the first computing system 20 can include a computing system onboard or otherwise associated with a real or simulated autonomous vehicle. In some implementations, model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 13 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of or "any combination of example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. An autonomous vehicle control system for controlling an autonomous vehicle, the autonomous vehicle control system comprising:
   one or more processors; and
   one or more non-transitory computer-readable media storing instructions that are executable to cause the one or more processors to perform operations, the operations comprising:
   (a) obtaining sensor data descriptive of an environment of the autonomous vehicle;

(b) identifying one or more objects in the environment based on the sensor data, the one or more objects associated with one or more possible decisions for the autonomous vehicle respecting the one or more objects;

(c) generating a plurality of candidate strategies that respectively correspond to a plurality of cost functions, wherein at least one candidate strategy of the plurality of candidate strategies corresponds to a distinct cost function and is generated by:

determining that at least two different groups of decisions correspond to the distinct cost function;

generating the at least one candidate strategy to represent an equivalence class of strategies that include the at least two different groups of decisions and share the distinct cost function;

(d) determining candidate trajectories respectively for the plurality of candidate strategies; and (e) initiating control of the autonomous vehicle based on a selected candidate trajectory.

2. The autonomous vehicle control system of claim 1, wherein (d) comprises, for a respective candidate strategy of the plurality of candidate strategies, optimizing a respective candidate trajectory using a corresponding cost function of the plurality of cost functions.

3. The autonomous vehicle control system of claim 2, wherein the corresponding cost function provides a locally defined basin of an optimization surface associated with the respective candidate strategy.

4. The autonomous vehicle control system of claim 1, wherein the operations comprise:

ranking, using a machine-learned strategy ranking model, the plurality of candidate strategies.

5. The autonomous vehicle control system of claim 4, wherein the ranking corresponds to ranked likelihoods of an expert driver following the plurality of candidate strategies.

6. The autonomous vehicle control system of claim 5, wherein the machine-learned strategy ranking model was trained by:

ranking training strategies for navigating a driving scenario;

comparing one or more of the ranked training strategies with ground truth data describing an expert response to the driving scenario; and updating the machine-learned strategy ranking model to increase a predicted likelihood of a training strategy corresponding to the expert response.

7. The autonomous vehicle control system of claim 4, wherein the plurality of cost functions correspond to a plurality of distinct probability distributions, such that the plurality of candidate strategies are respectively associated with the plurality of distinct probability distributions.

8. The autonomous vehicle control system of claim 7, wherein the plurality of distinct probability distributions comprise a plurality of distinct maximum entropy distributions.

9. The autonomous vehicle control system of claim 1, wherein the operations comprise:

generating the plurality of candidate strategies using a feasibility cost that is associated with a particular strategy and based on a margin of satisfaction of constraints associated with the particular strategy.

10. The autonomous vehicle control system of claim 9, wherein the feasibility cost comprises a measure of a minimum clearance of a constraint.

11. The autonomous vehicle control system of claim 9, wherein (c) comprises:

generating a graph structure comprising nodes corresponding to strategy states associated with the plurality of candidate strategies and edges corresponding to discrete decisions made with respect to the nodes, wherein the plurality of candidate strategies correspond to one or more leaf nodes respectively terminating one or more paths across the graph structure from a root node; and determining, based on comparison of a parent feasibility cost associated with a parent node and a child feasibility cost associated with a new child node, to terminate growth of the graph structure through the new child node.

12. The autonomous vehicle control system of claim 9, wherein (c) comprises:

generating a graph structure comprising nodes corresponding to strategy states associated with the plurality of candidate strategies and edges corresponding to discrete decisions made with respect to the nodes, wherein the plurality of candidate strategies correspond to one or more leaf nodes respectively terminating one or more paths across the graph structure from a root node; and determining, based on comparison of a threshold and a child feasibility cost associated with a new child node, to terminate growth of the graph structure through the new child node.

13. The autonomous vehicle control system of claim 1, wherein (c) comprises:

generating a graph structure comprising nodes corresponding to strategy states associated with the plurality of candidate strategies and edges corresponding to discrete decisions made with respect to the nodes, wherein the plurality of candidate strategies correspond to one or more leaf nodes respectively terminating one or more paths across the graph structure from a root node;

wherein the graph structure is generated by sorting the one or more possible decisions such that decisions near the root node of the graph structure have a higher likelihood of dominating successive decisions.

14. One or more non-transitory computer-readable media storing instructions executable to cause one or more processors to perform operations, the operations comprising:

(a) obtaining sensor data descriptive of an environment of an autonomous vehicle;

(b) identifying one or more objects in the environment based on the sensor data, the one or more objects associated with one or more possible decisions for the autonomous vehicle respecting the one or more objects;

(c) generating a plurality of candidate strategies that respectively correspond to a plurality of cost functions, wherein at least one candidate strategy of the plurality of candidate strategies corresponds to a distinct cost function and is generated by:

determining that at least two different groups of decisions correspond to the distinct cost function;

generating the at least one candidate strategy to represent an equivalence class of strategies that include the at least two different groups of decisions and share the distinct cost function;

(d) determining candidate trajectories respectively for the plurality of candidate strategies; and (e) initiating control of the autonomous vehicle based on a selected candidate trajectory.

15. The one or more non-transitory computer-readable media of claim 14, wherein (d) comprises, for a respective candidate strategy of the plurality of candidate strategies, optimizing a respective candidate trajectory using a corresponding cost function of the plurality of cost functions, wherein the corresponding cost function provides a locally defined basin of an optimization surface associated with the respective candidate strategy.

16. The one or more non-transitory computer-readable media of claim 14, wherein the operations comprise:
ranking, using a machine-learned strategy ranking model, the plurality of candidate strategies, wherein the ranking corresponds to ranked likelihoods of an expert driver following the plurality of candidate strategies, wherein the machine-learned strategy ranking model was trained by:
ranking training strategies for navigating a driving scenario;
comparing one or more of the ranked training strategies with ground truth data describing an expert response to the driving scenario; and
updating the machine-learned strategy ranking model to increase a predicted likelihood of a training strategy corresponding to the expert response.

17. The one or more non-transitory computer-readable media of claim 14, wherein the operations comprise:
generating the plurality of candidate strategies using a feasibility cost that is associated with a particular strategy and based on a margin of satisfaction of constraints associated with the particular strategy.

18. The one or more non-transitory computer-readable media of claim 17, wherein (c) comprises:
generating a graph structure comprising nodes corresponding to strategy states associated with the plurality of candidate strategies and edges corresponding to discrete decisions made with respect to the nodes, wherein the plurality of candidate strategies correspond to one or more leaf nodes respectively terminating one or more paths across the graph structure from a root node; and
determining, based on comparison of a parent feasibility cost associated with a parent node and a child feasibility cost associated with a new child node, to terminate growth of the graph structure through the new child node.

19. The one or more non-transitory computer-readable media of claim 17, wherein (c) comprises:
generating a graph structure comprising nodes corresponding to strategy states associated with the plurality of candidate strategies and edges corresponding to discrete decisions made with respect to the nodes, wherein the plurality of candidate strategies correspond to one or more leaf nodes respectively terminating one or more paths across the graph structure from a root node; and
determining, based on comparison of a threshold and a child feasibility cost associated with a new child node, to terminate growth of the graph structure through the new child node.

20. A computer-implemented method, the method comprising:
(a) obtaining sensor data descriptive of an environment of an autonomous vehicle;
(b) identifying one or more objects in the environment based on the sensor data, the one or more objects associated with one or more possible decisions for the autonomous vehicle respecting the one or more objects;
(c) generating a plurality of candidate strategies that respectively correspond to a plurality of cost functions, wherein at least one candidate strategy of the plurality of candidate strategies corresponds to a distinct cost function and is generated by:
determining that at least two different groups of decisions correspond to the distinct cost function;
generating the at least one candidate strategy to represent an equivalence class of strategies that include the at least two different groups of decisions and share the distinct cost function;
(d) determining candidate trajectories respectively for the plurality of candidate strategies; and
(e) initiating control of the autonomous vehicle based on a selected candidate trajectory.

* * * * *